United States Patent
Costantino et al.

(10) Patent No.: US 8,580,870 B2
(45) Date of Patent: *Nov. 12, 2013

(54) MANUFACTURING METHODS FOR THE PRODUCTION OF CARBON MATERIALS

(71) Applicant: EnerG2, Technologies, Inc., Seattle, WA (US)

(72) Inventors: Henry R. Costantino, Woodinville, WA (US); Aaron Feaver, Seattle, WA (US); William D. Scott, Seattle, WA (US)

(73) Assignee: EnerG2 Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/624,689

(22) Filed: Sep. 21, 2012

(65) Prior Publication Data

US 2013/0078443 A1    Mar. 28, 2013

Related U.S. Application Data

(63) Continuation of application No. 12/756,668, filed on Apr. 8, 2010, now Pat. No. 8,293,818.

(60) Provisional application No. 61/167,814, filed on Apr. 8, 2009, provisional application No. 61/219,344, filed on Jun. 22, 2009.

(51) Int. Cl.
*C08G 18/08* (2006.01)

(52) U.S. Cl.
USPC .......................................... 523/309

(58) Field of Classification Search
USPC .......................................... 523/309
See application file for complete search history.

(56) References Cited

U.S. PATENT DOCUMENTS

| | | |
|---|---|---|
| 4,082,694 A | 4/1978 | Wennerberg et al. |
| 4,159,913 A | 7/1979 | Birchall et al. |
| 4,198,382 A | 4/1980 | Matsui |
| 4,543,341 A | 9/1985 | Barringer et al. |
| 4,580,404 A | 4/1986 | Pez et al. |
| 4,862,328 A | 8/1989 | Morimoto et al. |
| 4,873,218 A | 10/1989 | Pekala |
| 4,954,469 A | 9/1990 | Robinson |
| 4,997,804 A | 3/1991 | Pekala |
| 5,260,855 A | 11/1993 | Kaschmitter et al. |
| 5,416,056 A | 5/1995 | Baker |
| 5,420,168 A | 5/1995 | Mayer et al. |
| 5,465,603 A | 11/1995 | Anthony et al. |
| 5,508,341 A | 4/1996 | Mayer et al. |
| 5,529,971 A | 6/1996 | Kaschmitter et al. |
| 5,626,637 A | 5/1997 | Baker |
| 5,626,977 A | 5/1997 | Mayer et al. |
| 5,674,642 A | 10/1997 | Le et al. |
| 5,710,092 A | 1/1998 | Baker |
| 5,789,338 A | 8/1998 | Kaschmitter et al. |
| 5,858,486 A | 1/1999 | Metter et al. |
| 5,945,084 A | 8/1999 | Droege |
| 5,965,483 A | 10/1999 | Baker et al. |
| 6,006,797 A | 12/1999 | Bülow et al. |
| 6,064,560 A | 5/2000 | Hirahara et al. |
| 6,072,693 A | 6/2000 | Tsushima et al. |
| 6,096,456 A | 8/2000 | Takeuchi et al. |
| 6,140,377 A * | 10/2000 | Schwertfeger et al. ........ 516/100 |
| 6,225,257 B1 | 5/2001 | Putyera et al. |
| 6,309,446 B1 | 10/2001 | Nakanoya et al. |
| 6,574,092 B2 | 6/2003 | Sato et al. |
| 6,592,838 B1 | 7/2003 | Nomoto et al. |
| 7,245,478 B2 | 7/2007 | Zhong et al. |
| 7,582,902 B2 | 9/2009 | Tano et al. |
| 7,723,262 B2 | 5/2010 | Feaver et al. |
| 7,816,413 B2 | 10/2010 | Feaver et al. |
| 7,835,136 B2 | 11/2010 | Feaver et al. |
| 8,293,818 B2 * | 10/2012 | Costantino et al. ........... 523/309 |
| 2002/0031706 A1 | 3/2002 | Dasgupta et al. |
| 2002/0031710 A1 | 3/2002 | Kezuka et al. |
| 2002/0114126 A1 | 8/2002 | Hirahara et al. |
| 2002/0168314 A1 | 11/2002 | Roemmler |
| 2002/0172637 A1 | 11/2002 | Chesneau et al. |
| 2003/0012722 A1 | 1/2003 | Liu |
| 2003/0064564 A1 | 4/2003 | Lin |
| 2003/0108785 A1 | 6/2003 | Wu et al. |
| 2003/0170548 A1 | 9/2003 | Otsuki et al. |
| 2005/0014643 A1 | 1/2005 | Lini et al. |
| 2005/0041370 A1 | 2/2005 | Wilk et al. |

(Continued)

FOREIGN PATENT DOCUMENTS

| CN | 1 762 900 A | 4/2006 |
|---|---|---|
| EP | 1514859 A2 | 3/2005 |

(Continued)

OTHER PUBLICATIONS

Alcañiz-Monge et al., "Methane Storage in Activated Carbon Fibres," *Carbon* 35(2):291-297, 1997.

Babić et al., "Characterization of carbon cryogel synthesized by sol-gel polycondensation and freeze-drying," *Carbon* 42:2617-2624, 2004.

Babić et al., "Characterization of carbon cryogels synthesized by sol-gel polycondensation," *J. Serb. Chem. Soc.* 70(1):21-31, 2005.

Barbieri et al., "Capacitance limits of high surface area activated carbons for double layer capacitors," *Carbon* 43:1303-1310, 2005.

Barton et al., "Tailored Porous Materials," *Chem. Mater.* 11:2633-2656, 1999.

Bock et al., "Structural Investigation of Resorcinol Formaldehyde and Carbon Aerogels Using SAXS and BET," *Journal of Porous Materials* 4:287-294, 1997.

(Continued)

*Primary Examiner* — Edward Cain

(74) *Attorney, Agent, or Firm* — Seed IP Law Group PLLC

(57) ABSTRACT

The present application is generally directed to activated carbon materials and methods for making the same. The disclosed methods comprise rapidly freezing synthetically prepared polymer gel particles. The methods further comprise drying, pyrolyzing, and activating steps to obtain an activated carbon material of high porosity. The disclosed methods represent viable manufacturing processes for the preparation of activated carbon materials.

26 Claims, 9 Drawing Sheets

(56) References Cited

U.S. PATENT DOCUMENTS

| | | |
|---|---|---|
| 2005/0058589 A1 | 3/2005 | Lundquist et al. |
| 2005/0079359 A1 | 4/2005 | Fujita et al. |
| 2005/0135993 A1 | 6/2005 | Xu et al. |
| 2006/0057355 A1 | 3/2006 | Suzuki et al. |
| 2006/0093915 A1 | 5/2006 | Lundquist et al. |
| 2006/0223965 A1 | 10/2006 | Trifu |
| 2006/0240979 A1 | 10/2006 | Hirahara et al. |
| 2007/0048605 A1 | 3/2007 | Pez et al. |
| 2007/0113735 A1 | 5/2007 | Feaver et al. |
| 2007/0292732 A1 | 12/2007 | Feaver et al. |
| 2008/0132632 A1 | 6/2008 | Schiraldi et al. |
| 2009/0035344 A1 | 2/2009 | Thomas et al. |
| 2010/0097741 A1 | 4/2010 | Zhong et al. |
| 2010/0110613 A1 | 5/2010 | Zhong et al. |
| 2010/0331179 A1 | 12/2010 | Feaver et al. |
| 2011/0002086 A1 | 1/2011 | Feaver et al. |
| 2011/0199716 A1 | 8/2011 | Feaver et al. |
| 2011/0223494 A1 | 9/2011 | Feaver et al. |
| 2012/0081838 A1 | 4/2012 | Costantino et al. |
| 2012/0202033 A1 | 8/2012 | Chang et al. |
| 2012/0262127 A1 | 10/2012 | Feaver et al. |
| 2013/0004841 A1 | 1/2013 | Thompkins et al. |
| 2013/0020349 A1 | 1/2013 | Feaver et al. |

FOREIGN PATENT DOCUMENTS

| | | |
|---|---|---|
| JP | 2004-514637 A | 5/2004 |
| JP | 2004-315283 A | 11/2004 |
| JP | 2005-093984 A | 4/2005 |
| JP | 2005-136397 A | 5/2005 |
| JP | 2005-187320 A | 7/2005 |
| WO | WO 02/39468 A2 | 5/2002 |
| WO | 2004/087285 A1 | 10/2004 |
| WO | WO 2004/099073 A2 | 11/2004 |
| WO | WO 2007/061761 A1 | 5/2007 |
| WO | WO 2011/002536 A2 | 1/2011 |
| WO | WO 2011/003033 A1 | 1/2011 |

OTHER PUBLICATIONS

Burchell et al., "Low Pressure Storage of Natural Gas for Vehicular Applications," *The Engineering Society for Advancing Mobility Land Sea Air and Space*, Government/Industry Meeting, Washington D.C., Jun. 19-21, 2000, 7 pages.

Butler et al., "Braking Performance Test Procedure for Hybrid Vehicle Energy Storage Systems: Capacitor Test Results," *Joint International Meeting of the Electrochemical Society*, Abstract 684, Honolulu, HI, Oct. 3-8, 2004, 5 pages.

Chmiola et al., "Anomalous Increase in Carbon Capacitance at Pore Sizes Less Than 1 Nanometer," *Science 313*:1760-1763, Sep. 22, 2006.

Conway et al., "Partial Molal Volumes of Tetraalkylammonium Halides and Assignment of Individual Ionic Contributions," *Trans. Faraday Soc. 62*:2738-2749, 1966.

Czakkel et al., "Influence of drying on the morphology of resorcinol-formaldehyde-based carbon gels," *Microporous and Mesoporous Materials 86*:124-133, 2005.

Ding et al., "How Conductivities and Viscosities of PC-DEC and PC-EC Solutions of $LiBF_4$, $LiPF_6$, LiBOB, $Et_4NBF_4$, and $Et_4NBF_6$ Differ and Why," *Journal of the Electrochemical Society 151*(12):A2007-A2015, 2004.

Edward, "Molecular Volumes and the Stokes-Einstein Equation," *Journal of Chemical Education 47*(4):261-270, Apr. 1970.

Eikerling et al., "Optimized Structure of Nanoporous Carbon-Based Double-Layer Capacitors," *Journal of the Electrochemical Society 152*(1):E24-E33, 2005.

Endo et al., "Morphology and organic EDLC applications of chemically activated AR-resin-based carbons," *Carbon 40*:2613-2626, 2002.

Feaver et al., "Activated carbon cryogels for low pressure methane storage," *Carbon 44*:590-593, 2006.

Gouérec et al., "Preparation and Modification of Polyacrylonitrile Microcellular Foam Films for Use as Electrodes in Supercapacitors," *Journal of the Electrochemical Society 148*(1):A94-A101, 2001.

Hahn et al., "A dilatometric study of the voltage limitation of carbonaceous electrodes in aprotic EDLC type electrolytes by charge-induced strain," *Carbon 44*:2523-2533, 2006.

Hirscher et al., "Are carbon nanostructures an efficient hydrogen storage medium?" *Journal of Alloys and Compounds 356-357*:433-437, 2003.

Hsieh et al., "Synthesis of mesoporous carbon composite and its electric double-layer formation behavior," *Microporous and Mesoporous Materials 93*:232-239, 2006.

Hu et al., "Effects of electrolytes and electrochemical pretreatments on the capacitive characteristics of activated carbon fabrics for supercapacitors," *Journal of Power Sources 125*:299-308, 2004.

Inomata et al., "Natural gas storage in activated carbon pellets without a binder," *Carbon 40*:87-93, 2002.

International Preliminary Report on Patentability for International Application No. PCT/US2006/044524, mailed May 27, 2008, 7 pages.

International Preliminary Report on Patentability for International Application No. PCT/US2007/084886, mailed May 19, 2009, 7 pages.

International Search Report and Written Opinion for International Application No. PCT/US2006/044524, mailed Apr. 11, 2007, 8 pages.

International Search Report and Written Opinion for International Application No. PCT/US2007/84886, mailed Jun. 11, 2008, 11 pages.

International Search Report and Written Opinion for International Application No. PCT/US2010/40836, mailed Sep. 8, 2010, 12 pages.

Khomenko et al., "High-voltage asymmetric supercapacitors operating in aqueous electrolyte," *Appl. Phys. A 82*:567-573, 2006.

Kocklenberg et al., "Texture control of freeze-dried resorcinol-formaldehyde gels," *Journal of Non-Crystalline Solids 225*:8-13, 1998.

Kowalczyk et al., "Estimation of the pore-size distribution function from the nitrogen adsorption isotherm. Comparison of density functional theory and the method of Do and co-workers," *Carbon 41*:1113-1125, 2003.

Lozano-Castelló et al., "Powdered Activated Carbons and Activated Carbon Fibers for Methane Storage: A Comparative Study," *Energy & Fuels 16*:1321-1328, 2002.

Lozano-Castelló et al., "Influence of pore structure and surface chemistry on electric double layer capacitance in non-aqueous electrolyte," *Carbon 41*:1765-1775, 2003.

Miller, "Pulse Power Performance of Electrochemical Capacitors: Technical Status of Present Commercial Devices," *Proceedings of the 8th International Seminar on Double Layer Capacitors and Similar Energy Storage Devices*, Deerfield Beach, Florida, Dec. 7-9, 1998, 9 pages.

Pekala, "Organic aerogels from the polycondensation of resorcinol with formaldehyde," *Journal of Materials Science 24*:3221-3227, 1989.

Pekala et al., "Structure of Organic Aerogels. 1. Morphology and Scaling," *Macromolecules 26*:5487-5493, 1993.

Perrin et al., "Methane Storage within Dry and Wet Active Carbons: A Comparative Study," *Energy & Fuels 17*:1283-1291, 2003.

Qu et al., "Studies of activated carbons used in double-layer capacitors," *Journal of Power Sources 74*:99-107, 1998.

Ravikovitch et al., "Unified Approach to Pore Size Characterization of Microporous Carbonaceous Materials from $N_2$, Ar, and $CO_2$ Adsorption Isotherms," *Langmuir 16*:2311-2320, 2000.

Reichenauer et al., "Microporosity in carbon aerogels," *Journal of Non-Crystalline Solids 225*:210-214, 1998.

Salitra et al., "Carbon Electrodes for Double-Layer Capacitors I. Relations Between Ion and Pore Dimensions," *Journal of the Electrochemical Society 147*(7):2486-2493, 2000.

Setoyama et al., "Simulation Study on the Relationship Between a High Resolution $\alpha_s$-Plot and the Pore Size Distribution for Activated Carbon," *Carbon 36*(10):1459-1467, 1998.

Simon et al., "Materials for electrochemical capacitors," *Nature Materials 7*:845-854, Nov. 2008.

Takeuchi et al., "Removal of single component chlorinated hydrocarbon vapor by activated carbon of very high surface area," *Separation and Purification Technology 15*:79-90, 1999.

(56) References Cited

OTHER PUBLICATIONS

Tamon et al., "Preparation of mesoporous carbon by freeze drying," *Carbon 37*:2049-2055, 1999.

Ue, "Mobility and Ionic Association of Lithium and Quaternary Ammonium Salts in Propylene Carbonate and γ-Butyrolactone," *J. Electrochem. Soc. 141*(12):3336-3342, Dec. 1994.

Wei et al., "A novel electrode material for electric double-layer capacitors," *Journal of Power Sources 141*:386-391, 2005.

Xie et al., "Pore size control of Pitch-based activated carbon fibers by pyrolytic deposition of propylene," *Applied Surface Science 250*:152-160, 2005.

Yamamoto et al., "Control of mesoporosity of carbon gels prepared by sol-gel polycondensation and freeze drying," *Journal of Non-Crystalline Solids 288*:46-55, 2001.

Yang et al., "Preparation of highly microporous and mesoporous carbon from the mesophase pitch and its carbon foams with KOH," *Carbon 42*:1872-1875, 2004.

Job et al., "Carbon aerogels, cryogels and xerogels: Influence of the drying methods on the textural properties of porous carbon materials," Carbon, 43:2481-2494, 2005.

Nishihara et al., "Preparation of resorcinol—formaldehyde carbon cryogel microhoneycombs," Carbon, 42:899-901, 2004.

Paakko, "Long and entangled native cellulose I nanofibers allow flexible aerogels and hierarchically porous templates for functionalities," Soft Matter, 4:2492-2499, 2008.

Pojanavaraphan et al., "Prevulcanized natural rubber latex/clay aerogel nanocomposites," European Polymer Journal, 44:1968-1977, 2008.

Tamon et al., "Influence of freeze-drying conditions on the mesoporosity of organic gels as carbon precursors," Carbon, 38:1099-1105, 2000.

Yamamoto et al., "Preparation and characterization of carbon cryogel microspheres," Carbon, 40:1345-1351, 2002.

International Search Report from corresponding PCT Appln. No. PCT/US2010/030396, filed Apr. 8, 2010; mailed Jul. 18, 2013.

* cited by examiner

MANUFACTURING METHODS FOR THE PRODUCTION OF CARBON MATERIALS

CROSS-REFERENCES TO RELATED APPLICATIONS

This application is a continuation of U.S. patent application Ser. No. 12/756,668 filed on Apr. 8, 2010, now allowed, which claims the benefit under 35 U.S.C. §119(e) of U.S. Provisional Patent Application No. 61/167,814 filed on Apr. 8, 2009; and U.S. Provisional Patent Application No. 61/219,344 filed on Jun. 22, 2009; both of which are incorporated herein by reference in their entireties.

STATEMENT OF GOVERNMENT INTEREST

Partial funding of the work described herein was provided by the U.S. Government under Contract No. W15P7T-09-C-S311 provided by the Department of Defense. The U.S. Government may have certain rights in this invention.

BACKGROUND

1. Technical Field

The present invention generally relates to polymer gels, polymer cryogels, activated carbon materials, and methods for making the same.

2. Description of the Related Art

Activated carbon is a highly porous form of elemental carbon, typically having a surface area of at least 500 $m^2/g$. Activated carbon materials are useful in many different applications. For example, activated carbon materials are used, inter alia, for chemical adsorption, gas storage, heterogeneous catalysis, and in energy storage devices. Given the broad demonstrated utility of activated carbon materials, efficient methods for their production are needed in the art.

One traditional approach to produce high surface area activated carbon materials, such as for use in ultracapacitor electrodes and other energy storage devices, has been to pyrolyze an existing carbon-containing material (e.g. coconut fibers or tire rubber). This results in a char with relatively low surface area which can subsequently be over-activated to produce a material with the porosity necessary for the desired application. Such an approach is inherently limited by the existing structure of the precursor material. This approach also typically results in low process yields due to removal of a large portion of the original char during the activation step.

Another approach for producing high surface area activated carbon materials has been to prepare a synthetic polymer from carbon-containing organic building blocks (e.g. a polymer gel). As with the existing organic materials, the synthetically prepared polymers are pyrolyzed and activated to produce an activated carbon material. In contrast to the traditional approach described above, the intrinsic porosity of the synthetically prepared polymer results in higher process yields because less material is lost during the activation step. In addition, some control over the pore size distribution of the final activated carbon material can be exerted by using different building blocks and/or polymerization conditions.

Although preparing activated carbon materials from synthetic polymers has several advantages over pyrolysis and activation of existing precursor materials, the known methods have several disadvantages. For example, preparation of activated carbon materials from synthetic polymers typically requires a time-consuming and expensive solvent exchange step prior to supercritical drying or freeze drying. Furthermore, the dried polymer material (e.g. polymer cryogel or aerogel) typically contains a residual amount of organic solvent. A viable manufacturing process for activated carbon materials must overcome these and other limitations of the existing methods.

While significant advances have been made in the field of activated carbon materials, there continues to be a need in the art for new and improved carbon materials and related methods. The present invention fulfills these needs and provides further related advantages.

BRIEF SUMMARY

In general terms, the present invention is directed to activated carbon materials processes for preparing the same. In one embodiment, the disclosure provides a method for making frozen polymer gel particles comprising rapidly freezing polymer gel particles, wherein the polymer gel particles have been generated from a polymer gel, and wherein the polymer gel has been prepared by reaction of one or more polymer precursers.

In another embodiment, the present disclosure provides a polymer cryogel comprising less than about 1000 ppm of organic solvent.

In some embodiments, the present disclosure provides activated polymer cryogel particles prepared according to the methods disclosed herein, wherein the activated polymer cryogel particles have a specific surface area of at least about 1000 $m^2/g$.

In some embodiments, the present disclosure provides pyrolyzed polymer cryogel particles prepared according to the methods disclosed herein, wherein the pyrolyzed polymer cryogel particles have a specific surface area of about 500 to about 800 $m^2/g$.

These and other aspects of the invention will be apparent upon reference to the attached drawings and following detailed description. To this end, various references are set forth herein which describe in more detail certain procedures, compounds and/or compositions, and are hereby incorporated by reference in their entirety.

BRIEF DESCRIPTION OF THE DRAWINGS

In the figures, identical reference numbers identify similar elements. The sizes and relative positions of elements in the figures are not necessarily drawn to scale and some of these elements are arbitrarily enlarged and positioned to improve figure legibility. Further, the particular shapes of the elements as drawn are not intended to convey any information regarding the actual shape of the particular elements, and have been solely selected for ease of recognition in the figures.

DETAILED DESCRIPTION

Figure 1:
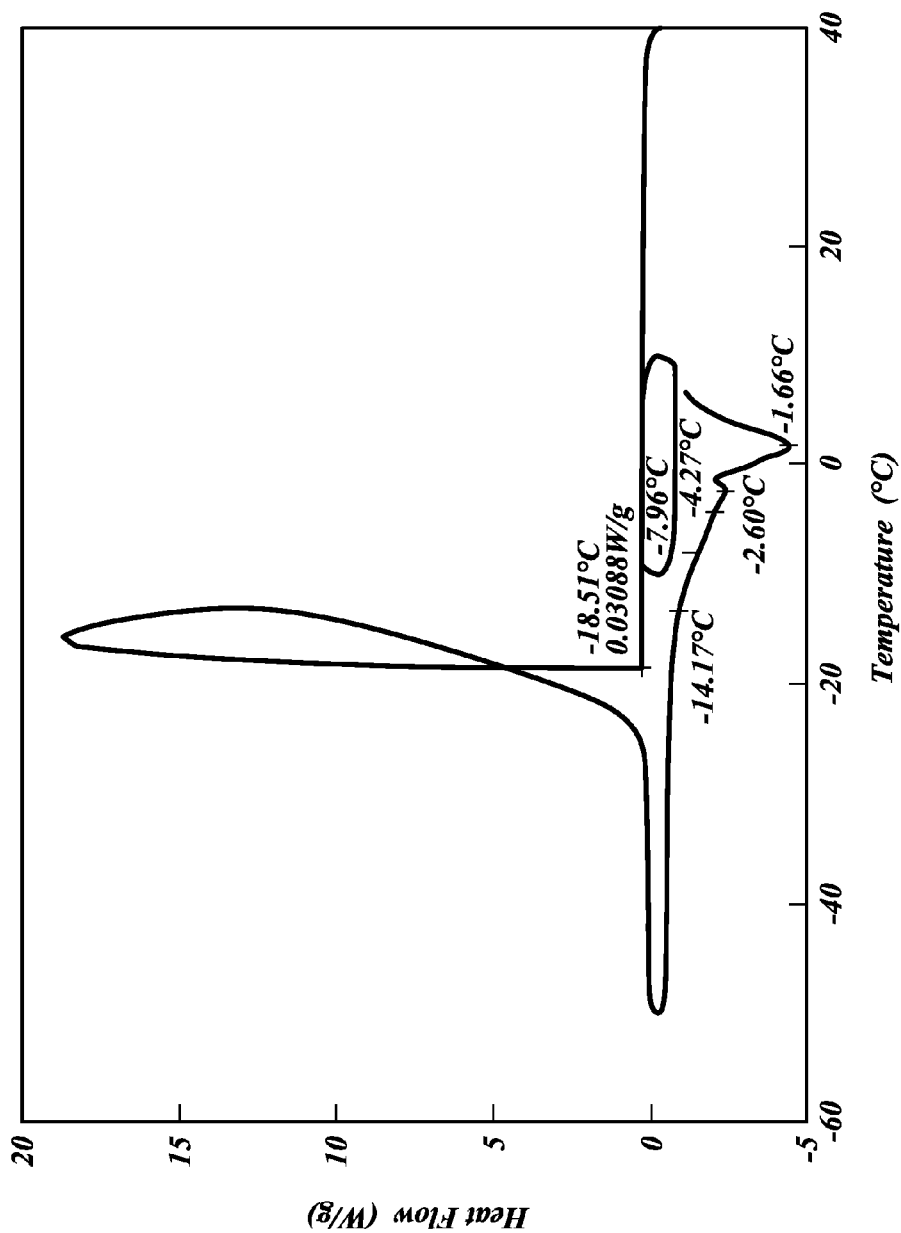
FIG. 1 shows a differential scanning calorimetry scan for a polymer hydrogel.

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

DEFINITIONS

As used herein, and unless the context dictates otherwise, the following terms have the meanings as specified below.

The term "polymer" refers to a substance composed of macromolecules. Polymers are generally composed of monomer building blocks.

The term "monolithic" refers to a solid, three-dimensional structure that is not particulate in nature.

As used herein the term "sol" refers to a colloidal suspension of precursor particles (e.g. monomer building blocks), and the term "gel" refers to a wet three-dimensional porous network obtained by condensation or reaction of the precursor particles.

As used herein the term "polymer gel" refers to gel in which the network component is a gel; generally a polymer gel is a wet (aqueous or non-aqueous based) three-dimensional structure comprised of a polymer formed from synthetic precursors or monomer building blocks.

As used herein the term "sol gel" refers to a sub-class of polymer gel where the polymer is a colloidal suspension that forms a wet three-dimensional porous network obtained by condensation of the precursor particles.

As used herein the term "polymer hydrogel" or "hydrogel" refers to a subclass of polymer gel wherein the solvent for the synthetic precursors or monomers is water or mixtures of water and one or more water-miscible solvent.

As used herein the term "RF hydrogel" refers to a sub-class of polymer gel wherein the polymer was formed from the catalyzed reaction of resorcinol and formaldehyde in water.

As used herein the phrase "synthetic polymer precursor material" or "polymer precursor" refers to compounds used in the preparation of a synthetic polymer. Examples of precursor materials that can be used in the preparation disclosed herein include, but are not limited to aldehydes (i.e. HC(=O)R, where R is an organic group), such as for example, methanal (formaldehyde); ethanal (acetaldehyde); propanal (propionaldehyde); butanal (butyraldehyde); glucose; benzaldehyde; cinnamaldehyde, as well as phenolic compounds that can be react with formaldehyde or other aldehydes in the presence of a basic catalyst to provide a polymeric gel (cross-linked gel).

As used herein, the phrase "dried polymer gel" refers to a polymer gel from which the solvent, generally water, or mixture of water and one or more water-miscible solvent, has been removed.

The term "cryogel" refers to a gel that has been freeze dried. Analogously, a "polymer cryogel" is a polymer gel that has been freeze dried. The term "cryogel", includes cryogels as defined below.

A "pyrolyzed cryogel" or "pyrolyzed polymer cryogel" is a cryogel or polymer cryogel that has been pyrolyzed but not yet activated.

An "activated cryogel" or "activated polymer cryogel" is a cryogel or polymer cryogel, as defined herein, which has been activated to activated carbon material.

The term "xerogel" refers to a polymer gel that is air dried, for example at or slightly below atmospheric pressure and at or above room temperature.

The term "aerogel" refers to polymer gel that is dried by supercritical drying, for example using supercritical carbon dioxide.

As used herein, "organic extraction solvent" refers to an organic solvent added to a polymer hydrogel after polymerization of the polymer hydrogel has begun, generally after polymerization of the polymer hydrogel is complete.

As used herein "rapid multi-directional freezing" refers to the process of freezing a polymer gel by creating polymer gel particles from a monolithic polymer gel, and subjecting said polymer gel particles to a suitably cold medium. The cold medium can be, for example, liquid nitrogen, nitrogen gas, or solid carbon dioxide. During rapid multi-directional freezing nucleation of ice dominates over ice crystal growth. The suitably cold medium can be, for example, a gas, liquid, or solid with a temperature below about −10° C. Alternatively, the suitably cold medium can be a gas, liquid, or solid with a temperature below about −20° C. Alternatively, the suitably cold medium can be a gas, liquid, or solid with a temperature below about −30° C.

As used herein, the terms "activate" and "activation" each refer to the process of heating a raw material or carbonized/pyrolyzed substance at an activation dwell temperature during exposure to oxidizing atmospheres (e.g. carbon dioxide, oxygen, or steam). The activation process generally results in a stripping away of the surface of the particles, resulting in an increased surface area. Alternatively, activation can be accomplished by chemical means, for example, impregnation with chemicals such as acids like phosphoric acid or bases like potassium hydroxide, sodium hydroxide or salts like zinc chloride, followed by carbonization.

As used herein, the terms "carbonizing", "pyrolyzing", "carbonization", and "pyrolysis" each refer to the process of heating a carbon-containing substance at a carbonization dwell temperature in an inert atmosphere (e.g. argon or nitrogen) or in a vacuum so that the targeted material collected at the end of the process is primarily carbon.

As used herein, "dwell temperature" refers to the temperature of the furnace during the portion of a process which is reserved for neither heating nor cooling, but maintaining a relatively constant temperature. For example, the carbonization dwell temperature refers to the relatively constant temperature of the furnace during carbonization, and the activation dwell temperature refers to the relatively constant temperature of the furnace during activation.

The term "pore" refers to an opening or depression in the surface, or a tunnel in a carbon material, such as for example a cryogel, aerogel, xerogel or activated cryogel, activated aerogel or activated xerogel. A pore can be a single tunnel or connected to other tunnels in a continuous network throughout the structure.

As used herein the term "pore structure" refers to the layout of the surface of the internal pores within a carbon material, such as an activated carbon. Components of the pore structure include pore size, pore volume, surface area, density, pore size distribution, and pore length. Generally the pore structure of activated carbon material comprises micropores and mesopores.

The term "mesopore" generally refers to pores having a diameter between about 2 nanometers and about 50 nanometers. The term "micropore" refers to pores having a diameter less than about 2 nanometers.

The term "surface area" refers to the total specific surface area of a substance measurable by the BET technique, typically expressed in units of $m^2/g$. The BET (Brunauer/Emmett/Teller) technique employs an inert gas, usually nitrogen, to measure the amount of gas adsorbed on a material and is commonly used in the art to determine the accessible surface area of materials.

As used herein "connected" when used in reference to mesopores and micropores refers to the spatial orientation of such pores.

As used herein "effective length" refers to the portion of the length of the pore that is of sufficient diameter such that it is available to accept salt ions from the electrolyte.

As used herein the term "tunable" refers to an ability to adjust up or down any one of pore size, pore volume, surface area, density, pore size distribution, and pore length of either or both of the mesopores and micropores as well as other properties of the polymer hydrogel, polymer gel, pyrolyzed polymer cryogel, or activated polymer cryogel. Tuning the pore structure can be accomplished a number of ways, including but not limited to, varying parameters in the production of a polymer gel; varying parameters in the freeze-drying of the polymer gel; varying parameters in the carbonizing of the dried polymer cryogel; and varying the parameters in the activation of the dried polymer cryogel as well as other techniques disclosed herein.

As noted above, in some embodiments of the present disclosure, a method for making frozen polymer gel particles is provided. The method comprises rapidly freezing polymer gel particles, wherein the polymer gel particles have been generated from a polymer gel, and wherein the polymer gel has been prepared by reaction of one or more polymer precursers.

In further embodiments, of the above method, the method further comprises lyophilizing the frozen polymer gel particles to obtain polymer cryogel particles.

In further embodiments, of the above method, the method further comprises pyrolyzing polymer cryogel particles to obtain pyrolyzed polymer cryogel particles, wherein the polymer cryogel particles have been prepared by lyophilizing the frozen polymer gel particles.

In further embodiments, of the above method, the method further comprises activating pyrolyzed polymer cryogel particles to obtain activated polymer cryogel particles, wherein the pyrolyzed polymer cryogel has been prepared by pyrolyzing a polymer cryogel, and wherein the polymer cryogel has been prepared by lyophilizing the frozen polymer gel particles.

In further embodiments of the above method, rapidly freezing the polymer gel particles comprises immersing the polymer gel particles in a liquid having a temperature below about −10° C. For example, in some embodiments, the liquid has a temperature below about −30° C.

In other further embodiments, the polymer gel particles are generated by grinding or milling the polymer gel.

In other further embodiments, the liquid is liquid nitrogen.

In other further embodiments, the liquid is ethanol.

In other further embodiments, the polymer gel particles have an average particle size of less than about 30 mm. For example, in some embodiments, the polymer gel particles have an average particle size of about 0.5 mm to about 10 mm.

In other further embodiments, the polymer gel particles are immersed in the liquid at a rate of about 5 grams/min.

In other further embodiments, rapidly freezing the polymer gel particles comprises admixing the polymer gel particles with a cold solid. For example, in some further embodiments the gas is nitrogen.

In other further embodiments, rapidly freezing the polymer gel particles comprises admixing the polymer gel particles with a gas having a temperature below about −10° C. For example, in some further embodiments the gas is liquid nitrogen.

In other further embodiments, the polymer gel particles are generated by grinding or milling the polymer gel in the presence of a cold solid. For example, in some further embodiments, the cold solid is solid carbon dioxide.

In other further embodiments, rapidly freezing the polymer gel particles comprises contacting the polymer gel particles with an atomized liquid having a temperature below about −10° C. In some further embodiments, the atomized liquid has a temperature below about −30° C. In some other further embodiments the atomized liquid is liquid nitrogen.

In other further embodiments, rapidly freezing the polymer gel particles comprises contacting sprayed droplets comprising the polymer gel particles with a cold medium having a temperature below about −10° C. to obtain frozen droplets comprising the frozen polymer gel particles. For example, in some embodiments, the cold medium has a temperature below about −30° C.

In other further embodiments of the above method, the sprayed droplets comprise a suspension of the polymer gel particles.

In other further embodiments, the polymer gel particles comprise polymer gel having a viscosity of less than about 1000 cP.

In other further embodiments, the sprayed droplets comprise polymer gel particles comprising incompletely polymerized polymer gel. For example, in some further embodiments, polymerization of the polymer gel is completed after the sprayed droplets are contacted with the cold medium (i.e. after the freezing step). In other further embodiments, the frozen droplets are lyophilized to obtain freeze-dried particles and the polymerization reaction is completed within the freeze-dried particle. In yet other further embodiments, polymerization of the polymer gel is completed within the frozen droplets.

In other further embodiments, the sprayed droplets further comprise microspheres comprising the polymer gel particles. For example, in some further embodiments, the microspheres comprise an emulsion selected from a water-in-oil (w/o) emulsion, oil-in-water (o/w) emulsion, oil-in-water-oil (o/w/o) emulsion, water-in-oil-in-water (w/o/w) emulsion, and water-in-oil-in-oil (w/o/o) emulsion. the emulsion comprises a surfactant selected from non-ionic, cationic, non-ionic polymeric, and non-ionic polymeric fluorinated surfactants.

In other further embodiments, the sprayed droplets are contacted with liquid nitrogen or ethanol having a temperature below about −30° C.

In other further embodiments, rapidly freezing the polymer gel particles comprises rapidly puling a vacuum on the polymer gel particles.

In other further embodiments, the one or more polymer precursors are selected from phenolic compounds and aldehydes. For example, in some further embodiments, the one or more polymer precursors are selected from resorcinol and formaldehyde.

In other further embodiments, preparing the polymer gel further comprises adding a basic catalyst to a mixture of resorcinol and formaldehyde. For example, some other further embodiments, the basic catalyst is sodium carbonate. In yet other further embodiments, the molar ratio of resorcinol to catalyst is from about 50 to 1 to about 100 to 1. In yet other further embodiments, the molar ratio of resorcinol to catalyst is from about 25 to 1 to about 50 to 1.

In other further embodiments, water is added as a solvent to a mixture of resorcinol and formaldehyde, and wherein the ratio of resorcinol to water is from about 0.05 to 1 to about 0.70 to 1. For example, in further embodiments, the ratio of resorcinol to water is from about 0.15 to 1 to about 0.35 to 1.

In other further embodiments, the polymer gel comprises less than about 1000 ppm of organic solvent.

In other further embodiments of the above method, lyophilizing the frozen polymer gel particles comprises placing the frozen polymer gel particles in a lyophilizer having a shelf temperature of between about 10° C. and about 25° C.

In other further embodiments, lyophilizing the frozen polymer gel particles comprises placing the frozen polymer gel particles under reduced pressure of between about 50 mTorr and about 1000 torr.

In other further embodiments, pyrolyzing the polymer cryogel particles comprises heating the polymer cryogel particles for between about 0 and about 60 minutes.

In other further embodiments, pyrolyzing the polymer gel particles comprises heating the polymer gel particles at temperatures from about 700° C. to about 1200° C. For example in other further embodiments, pyrolyzing the polymer gel particles comprises heating the polymer gel particles at temperatures from about 850° C. to about 1050° C.

In other further embodiments, activating the pyrolyzed polymer gel particles comprises heating the pyrolyzed polymer gel particles for between about 1 minute and about 10 minutes.

In other further embodiments, activating the pyrolyzed polymer gel particles comprises contacting the pyrolyzed polymer gel particles with an activating gas.

In other further embodiments, activating the pyrolyzed polymer gel particles comprises heating the pyrolyzed polymer gel particles at temperatures from about 800° C. to about 1300° C. For example, In other further embodiments, activating the pyrolyzed polymer gel particles comprises heating the pyrolyzed polymer gel particles at temperatures from about 900° C. to about 1050° C.

In other further embodiments, activating the pyrolyzed polymer gel particles comprises activating the pyrolyzed polymer gel particles to a degree of activation from about 5% to about 90%.

In some embodiments, the present disclosure provides A polymer cryogel comprising less than about 1000 ppm of organic solvent. For example, in other further embodiments the organic solvent is t-butanol. In another embodiment, the organic solvent is acetone In other further embodiments, the polymer cryogel has a tap density of between about 0.10 cc/g and about 0.60 cc/g. For example, in a further embodiment, the polymer cryogel has a tap density of between about 0.15 cc/g and about 0.25 cc/g.

In other further embodiments, the polymer cryogel has a BET specific surface area of between about 150 $m^2$/g to about 700 $m^2$/g. Alternatively, the polymer cryogel has a BET specific surface area of between about 400 $m^2$/g to about 700 $m^2$/g.

In some embodiments, the present disclosure provides activated polymer cryogel particles prepared according to the methods disclosed herein, wherein the activated polymer cryogel particles have a specific surface area of at least about 1000 $m^2$/g.

In some embodiments, the present disclosure provides pyrolyzed polymer cryogel particles prepared according to the methods disclosed herein, wherein the pyrolyzed polymer cryogel particles have a specific surface area of about 500 to about 800 $m^2$/g.

In further embodiments, the pyrolyzed polymer cryogel particles have a tap density of between about 0.40 cc/g and about 0.60 cc/g.

The activated carbon materials produced according to the methods disclosed herein can be used in applications requiring stable, high surface area micro- and mesoporous structure including for example, ultracapacitor electrodes, solid-state gas storage, capacitive deionization of salt water, biomedical applications including poison control and drug delivery, such as sustained drug delivery of low-molecular weight and macromolecular drugs, tissue engineering applications including tissue scaffolding, air filtration, water filtration, catalytic convertors, and as carbon-based scaffold support structure for catalytic functions such as hydrogen storage or fuel cell electrodes.

Rapid Freezing of Polymer Gels

Activated polymer cryogels may be prepared by the following steps:

1. Admixing appropriate precursors (e.g. resorcinol and formaldehyde in a 1:2 ratio) in stirred DI water and then adding catalyst (e.g. sodium carbonate) at room temperature.

2. The resulting sols are then sealed in glass ampoules or vials and gelled at 90° C. for at least 24 h or until gelation was complete.

3. The resulting hydrogels are then subjected to solvent exchange to replace water with an organic solvent (e.g. tert-butanol) by rinsing three times in fresh organic solvent for 24 h each time.

4. The solvent exchanged gels are then subsequently freeze dried (i.e. lyophilized) for 3 days.

5. The resulting cryogels are then pyrolyzed at set times and temperatures

6. The polymer cryogels are then activated to produce an activated carbon material that could be used, for example, as an ultracapacitor electrode.

The method described above suffers from several disadvantages. For example, the solvent exchange step is time consuming, expensive, and environmentally unfriendly. In addition, the resulting cryogel comprises residual amounts of the organic extraction solvent. A viable manufacturing process must address these disadvantages.

Accordingly, in one embodiment, the present disclosure provides a method of preparing polymer cryogels wherein the solvent exchange step is eliminated. Instead, the polymer gels are rapidly frozen and lyophilized without undergoing solvent exchange. The resulting polymer cryogels are substantially free of organic extraction solvent, for example t-butanol or acetone.

As noted above, the processing techniques generally employed in the production of activated carbon are relatively inexpensive and scalable, with the exception of performing a solvent exchange of the aqueous solvent for an organic solvent, such as t butanol prior to freeze-drying. Solvent exchange has generally been used so that the dried material retains the pore structure built during the water-based gelation process described herein. This exchange step is one variable that contributes to the high mesoporosity of an activated carbon material and correspondingly the high power performance demonstrated in ultracapacitors using such an activated carbon.

Without being bound by theory, freeze-drying the polymer gel, as opposed to air-drying which is generally employed in the preparation of xerogels, is thought to prevent or minimize capillary forces within the pores of the polymer. In the freeze-drying process, after the solvent present in the polymer gel freezes, it is sublimated directly to a gas and no meniscus forms that could destroy the pore structure. An organic solvent, such as t butanol or acetone, is routinely used as the solvent during freeze drying instead of water because of the difference in the expansion coefficients of the solvents during freezing. When water freezes inside the pores of a polymer gel, the water expands as it becomes solid and destroys the polymer network; t butanol can be easily frozen due to its near-room temperature freezing point (25° C.) and does not exert the same destructive pressure on the pore walls as the freezing of water does. Unfortunately, t-butanol is expensive, potentially damaging to the environment, and generally a large volume of it is needed to produce a solvent exchanged gel (the volume of solvent used is approximately 10 times the volume of the gel being dried).

One approach used by the inventors to avoid the limitations associated with the use of t-butanol or other organic extraction solvents is to eliminate the step of solvent exchange of water for t butanol or other organic extraction solvents and directly freeze the water inside the polymer gel quickly. The crystal structure of solid phase water takes up a larger volume than does the disorganized liquid phase. However, it is possible to produce water in a solid state without allowing it to crystallize and expand. If the temperature of water is reduced at a fast enough rate, the water molecules do not have time to organize into an ordered crystal structure. The result is super-cooled water which transforms into an amorphous phase of solid, frozen water. The coefficient of expansion of this material relative to liquid water is nearly 1.0. So the structure of a polymer gel filled with "ice" (super-cooled water) of this type is subject to only very minimal freezing stresses.

There are several approaches for inducing a super cooled state on water trapped inside a small volume. Such techniques have been employed to induce a super cooled state on the water in the pores of a polymer gel as disclosed herein. In one embodiment, super-cooling water in the pores of a polymer gel is performed by rapidly cooling small particles of polymer gel (having an average particle size of less than about 30 mm) by immersing them in a suitably cold liquid, for example, liquid nitrogen at −196° C. or ethanol cooled by dry ice. In another embodiment, the polymer gel is rapidly frozen by co-mingling or physical mixing of polymer gel particles with a suitable cold solid, for example, dry ice (solid carbon dioxide. Another method is to use a blast freezer with a metal plate at −60° C. to rapidly remove heat from the polymer gel particles scattered over its surface. A third method of rapidly cooling water in a polymer gel particle is to snap freeze the particle by pulling a high vacuum very rapidly (the degree of vacuum is such that the temperature corresponding to the equilibrium vapor pressure allows for freezing). However, this method does not achieve the targeted very low temperature of the material during the freezing step; for example, the temperature of the material prior to snap freezing may be close to 0° C., and upon rapid exposure to a high vacuum the material remains around 0° C. Yet another method for rapid freezing comprises admixing a polymer gel with a suitably cold gas. In some embodiments the cold gas may have a temperature below about −10° C. In some embodiments the cold gas may have a temperature below about −20° C. In some embodiments the cold gas may have a temperature below about −30° C. In yet other embodiments, the gas may have a temperature of about −196° C. For example, in some embodiments, the gas is nitrogen.

In one embodiment, milled samples of polymer gel particles are loaded into an appropriate freezer (blast or snap freezing) and frozen. In another embodiment, liquid nitrogen quenching is accomplished with a particulate sample. For example, a sample to be quenched is added at a rate of 5 g per minute to a 1-L bowl shaped Dewar containing liquid nitrogen, thereby allowing time for the sample to quench, freeze, and sink to the bottom of the bath. In another analogous embodiment, ethanol cooled by dry ice is used instead of liquid nitrogen. The milled polymer gel particles may have a diameter prior to freezing of less than about 30 mm, for example, between about 0.01 mm and about 25 mm; alternately, the average diameter of said polymer gel particles prior to freezing is between about 0.1 mm and about 10 mm, or about 0.7 mm and about 7 mm. In some examples, the polymer gel particles are between about 2 mm and about 5 mm.

The rapidly frozen particles may be collected using various approaches known to those of skill in the art, for example by sedimentation, by centrifugation, by containment in a permeable membrane, comprised of a stainless steel or polymeric fiber mesh.

After collecting the rapidly frozen sample, they are transferred to a standard freezer for temporary storage. They are placed in the freeze dryer within 48 hours in carefully timed batches to prevent occurrence of a water phase transition from amorphous to crystalline ice. After removal from the freeze dryer, samples can be stored under a nitrogen blanket in a closed container for long periods of time.

While it is not generally practical to process material that has too small of a particle size, particularly when dealing with large kilns with controlled gas environments, as in the later pyrolysis/activation steps, it is beneficial to the super cooling process to have small particles size. The cooling rate is an important variable in achieving a super cooled state. Smaller particles cool quicker much the same way that a droplet of water might freeze instantaneously whereas a full glass takes many hours. For the snap freezing option, smaller particles would also be better because there is more surface area available for evaporation/sublimation—both cooling processes—to occur. A finer mesh size has more surface area per pound of gel and hence cools faster when a vacuum is applied. The relationship between mesh size of the polymer gel particles and the super cooling method is related to the mesopore volume and can be optimized based on the approaches disclosed herein.

In some embodiments, the particles of polymer gel are solid particles. In other embodiments, the particles of polymer gel are suspended in a suitable liquid medium to form a suspension of polymer gel particles. In yet other embodiments, the particles of polymer gel are solubilized in a suitable solvent. Examples of polymer gels that can be formulated as solutions or suspensions include but are not limited to polymer gels prepared from resorcinol and formaldehyde, saccharide polymers such as starch and dextran, poly(ethylene glycols), polyacrylates, polyamides, polyesters, polycarbonates, polyimides, and polystyrenes. The polymer can be in the form of a polymer or co-polymer, or mixture of polymers. The molecular weight of the polymer can be unimodal, bimodal, or multimodal in character, or, for example, a mixture of polymers of various molecular weights.

In some embodiments, atomized liquid nitrogen, as opposed to bulk liquid nitrogen, is used for rapidly freezing polymer gels. Atomized liquid nitrogen can be formed by various methods known in the art, for example, single-fluid and two-fluid atomization.

In some embodiments, atomized or bulk liquid nitrogen is used for spray freezing a polymer gel which is suspended in a sprayed droplet of a suitable fluid. The frozen spray is formed from liquid droplets having an average diameter of less than 10,000 microns, less than 1000 microns, less than 100 microns, or even less than 10 microns.

In some embodiments, an atomized liquid is used for rapidly freezing solid particles of polymer gel. For example, in some embodiments, the atomized liquid may have a temperature of less than about $-10°$ C. In other embodiments, the atomized liquid may have a temperature of less than about $-20°$ C. In yet other embodiments, the atomized liquid may have a temperature of less than about $-30°$ C. In other embodiments, atomized liquid nitrogen is used for rapidly freezing solid particles of polymer gel, as opposed to a bulk form (e.g., bulk solution or bulk monolith). The frozen particles can be comprised of solid particles having an average diameter of less than 10,000 microns, less than 1000 microns, less than 100 microns or even less than 10 microns. In other embodiments, droplets comprised of multi-phasic systems, such as suspensions or emulsions, can also be rapidly frozen under the conditions disclosed herein In another embodiment, the polymer gel particles are comprised of a viscous polymer gel, for example a polymer gel having a viscosity in the range of less than about 10 cP, or less than about 100 cP, or even less than about 1000 cP viscosity. The viscous polymer gel may be produced by a number of techniques known to those of skill in the art. For example, the viscous polymer gel may be comprised of a partially polymerized form of the polymer gel, and/or may be comprised of a relatively low molecular weight form of the polymerized polymer gel. Alternately, the viscous polymer gel may be formed at an elevated temperature, such as for example, 80-100° C. In some embodiments, lower temperatures can be used in conjunction with an increase in gelation time. With sufficient time, complete gelation can occur at temperatures as low as 20° C., so the range of applicable temperatures is from 20-100° C., depending on the time required for gelation. Alternately, gelation can occur at temperatures higher than 100° C. in a 100% humidity environment. In some embodiments, Temperatures up to 200° C. may be used. Such temperatures can be achieved, for example, by the use of steam. The resulting polymer gel is maintained at that elevated temperature during the atomization step described below.

The viscous polymer gel prepared as described above is atomized by various approaches known to those of skill in the art for atomizing viscous materials, for example, using high-pressure single-fluid atomization or two-fluid atomization, sonication nozzle atomization, spinning disk atomization, or electrostatic atomization. Following atomization, droplets of the highly viscous polymer gel are frozen rapidly, for example by spray freezing, as described above (i.e. the atomized spray is contacted with a suitably cold medium, for example, liquid nitrogen or ethanol cooled by dry ice). For example, in some embodiments, the suitably cold medium may have a temperature of less than about $-10°$ C. In other embodiments, the suitably cold medium may have a temperature of less than about $-20°$ C. In yet other embodiments, the suitably cold medium may have a temperature of less than about $-30°$ C. The rapidly frozen particles are then collected and the resulting ice formed therein is removed by sublimation. Sublimation of the ice is accomplished by lyophilization under conditions suitable to maintain the fine ice crystal structure as described in more detail herein.

In another embodiment, the polymer gel is rapidly frozen before polymerization is complete. For example, droplets of a resorcinol/formaldehyde/sodium carbonate mixture may be rapidly frozen, for example by spray freezing. The rapidly frozen particles are then collected, and polymerization of the mixture is completed within the frozen particle. Analogously, droplets of a resorcinol/formaldehyde/sodium carbonate mixture in which polymerization has not yet been initiated may be rapidly frozen, for example by spray freezing. Polymerization may then be initiated and completed within the rapidly frozen droplet.

Polymerization within the frozen particles may be accomplished using a method other than heating, for example by microwave irradiation. As disclosed herein, the polymerization conditions can employ relatively low temperatures, for example in the range of less than 100° C. or less than 50° C. over a relatively long time for example more than 1 day or more than several days compared to conventional conditions where polymerization is accomplished at relatively high temperatures for example above 50° C. or above 100° C. and for a relatively short time, for example, less than several days, preferably less than one day. After the polymerization is deemed complete, the ice formed in the freezing process can be removed by sublimation, such as by lyophilization under conditions suitable to maintain the fine ice crystal structure as described in more detail below.

In one embodiment, polymerization of resorcinol and formaldehyde or other polymer precursors can be started before the freezing step and completed in the frozen particle. In another embodiment, polymerization of resorcinol and formaldehyde or other polymer precursors can be started before the freezing step and completed in the freeze dried particle (i.e., after lyophilization). In yet another embodiment, polymerization of resorcinol and formaldehyde or other polymer precursors can be started in the frozen particle (after freezing step is completed), and completed thereafter in the freeze-dried particle. In yet another embodiment, polymerization of resorcinol and formaldehyde or other polymer precursors can be started and completed in the freeze dried particle.

In yet another embodiment, the polymer gel particles may be comprised of microspheres that are created by an emulsion approach, such as a water-in-oil (w/o) emulsion, oil-in-water (o/w) emulsion, oil-in-water-oil (o/w/o) emulsion, water-in-oil-in-water (w/o/w) emulsion, and water-in-oil-in-oil (w/o/o) emulsion. In such microspheres, the aqueous phase may contain polymer precursors, for example, resorcinol and formaldehyde, wherein the polymerization has either not yet been initiated or has been initiated but not yet completed, and the organic phase can comprise an appropriate organic solvent. Polymerization can be confined to the aqueous phase (within the w/o, w/o/w/ or w/o/o emulsion) comprising the polymer precursors. Such microspheres can additionally contain surfactants, such as, but not limited to nonionic (e.g. SPAN80), cationic (e.g. trimethylstearylammonium chloride, C18), nonionic polymeric fluorinated (e.g. FC4430), and nonionic polymeric surfactants. When nonionic surfactants are present, the ratio of the emulsifiers to solvent, the temperature of the emulsification and the holding time of the emulsification may all play a role in the properties of the resulting polymer cryogel microspheres.

In another embodiment, a solution of polymer precursors, for example, resorcinol and formaldehyde, in which polymerization is not yet initiated may be emulsified in an organic phase, for example to create a w/o emulsion. In yet another embodiment, a solution of polymer precursors, for example, resorcinol and formaldehyde, in which polymerization is partially progressed is emulsified in an organic phase. Emulsification can be accomplished by various means known to the art including but not limited to high-speed mixing, sonication, homogenization (for example rotor stator homogenization), etc. Polymerization to yield a polymer gel is carried out under conditions known to those of skill in the art and as disclosed herein. The microspheres comprising polymer gel are harvested using methods familiar to those of skill in the art.

In these embodiments, the harvested microspheres are rapidly frozen, for example by spray freezing. The spray freezing is accomplished by contacting the atomized droplets of the w/o produced microspheres with atomized droplets of liquid nitrogen, or bulk liquid nitrogen, or another suitably cold fluid, for example, ethanol in dry ice or ethanol cooled by another means. The w/o microspheres are frozen via spray freezing over a length of time that ranges from several seconds to substantially less than one second. Generally the w/o microspheres are frozen via spray freezing over a period of substantially less than one second. The rapidly frozen w/o microspheres are collected by various approaches known to those of skill in the art, for example by sedimentation, by centrifugation, by containment in a permeable membrane, for example comprised of a stainless steel or polymeric fiber mesh, etc. Sublimation of ice from the collected microspheres is accomplished by lyophilization under conditions suitable to maintain the fine ice crystal structure as described in more detail below.

Alternatively, the solution of polymer precursors, for example, resorcinol and formaldehyde, is emulsified in an organic phase, and further emulsified in a second organic phase to create a w/o/o emulsion. Emulsification to create the double emulsion can be carried out by various means known in the art, as described above. Polymerization is then carried out under conditions known to those of skill in the art, and the microspheres harvested using methods disclosed herein. The microspheres are rapidly frozen, for example by spray freezing. The spray freezing is accomplished by contacting the atomized droplets of the w/o/o produced microspheres with atomized droplets of liquid nitrogen, or bulk liquid nitrogen, or another suitably cold fluid, for example, ethanol in dry ice or ethanol cooled by another means. The rapidly frozen w/o/o microspheres are collected and the ice formed during the rapid freezing step is removed by sublimation. Sublimation of ice is accomplished by lyophilization under conditions suitable to maintain the fine ice crystal structure as described in more detail below.

In another alternative embodiment, the solution of polymer precursors, for example, resorcinol and formaldehyde, is emulsified in an organic phase, for example, to create a w/o emulsion. Polymerization is then carried out under conditions known to those of skill in the art, and the microspheres are rapidly frozen, for example, by spray freezing into a second organic phase, creating a w/o/o particle. Similar methodologies as described above for spray freezing the single emulsion embodiment can also be employed for spray freezing the w/o/o particle. In this case, the spray freezing is accomplished by contacting the atomized droplets of the w/o produced microspheres with atomized droplets of liquid cold second organic phase, or contacting the atomized droplets with a cold bulk second organic phase. The rapidly frozen w/o/o particles are collected and ice is removed by sublimation such as by lyophilization under conditions suitable to maintain the fine ice crystal structure as described in more detail below.

In yet another embodiment, the solution of polymer precursors, for example, resorcinol and formaldehyde, is emulsified in an organic phase, and further emulsified in a second aqueous phase to create a w/o/w emulsion. Similar methodologies as described above for spray freezing the single emulsion embodiment and the w/o/w embodiment can also be employed for spray freezing the w/o/w particle. Polymerization is carried out under conditions known to those of skill in the art, and the microspheres are harvested. The harvested microspheres are rapidly frozen, for example by spray freezing. The rapidly frozen w/o/w microspheres are collected and ice removed by lyophilization under conditions suitable to maintain the fine ice crystal structure as described in more detail below.

In another embodiment of the present disclosure, spray freezing can be performed on an aqueous or organic solution or suspension of a polymer gel. Use of a pre-formed polymer obviates the need for a polymerization step in the process disclosed above since the starting material is already polymeric. The solution or suspension can be atomized by methods known to those of skill in the art. The atomized material is then subject to spray freezing. The rapidly frozen particles are collected and the ice removed by sublimation such as lyophilization under conditions suitable to maintain the fine ice crystal structure as described herein. In the case of an aqueous milieu, freeze drying is employed to remove water ice, and in the case of an organic milieu, freezing drying or other suitable technique is employed to remove the frozen crystals of the organic solvent.

The rapid freezing approaches described herein allow fine ice formation via a high degree of nucleation with little time for crystal growth due to the extremely rapid freezing rate. Without wishing to be bound by theory, freezing models may be used to optimize freezing conditions. For example, consider a freezing model based on a steady-state heat transfer phenomenon in which the heat is transported from the cold environment (Tc) through the freezing front (the frozen layer, dr, at a temperature of Tf):

$$Q=AK(Tf-Tc)/(R-r)$$

where Q is the heat transfer rate (J/sec), A is the surface area of the freezing layer equal to $4\pi r2$, and K is thermal conductivity of the matrix, e.g., ice (~2.2 watt m−1 K−1 at about 0° C.). Assuming that the heat transferred is consumed for water freezing into ice, and using ΔH the latent heat of water freezing (3.34×105 J/kg), ρ the density of water (1000 kg/m3), ΔT=(Tf−Tc), and rearranging and integrating yields:

$$\Theta=(\Delta H \rho R2)/(2K\Delta T)$$

where Θ is the time to complete freezing, i.e., the "freezing time." According to this model, for droplets of R=1, 10, and 100 m, freezing time would be ~4×10-7 s, ~4×10-5 s, ~4×10-3 s, respectively.

Thus, freezing time is proportional to length of material to freeze squared, or another way to look at it is that freezing rate is proportional to Θ-1 or length-2. For "classical" freeze drying, even "rapid" freezing from a lyophilized shelf would be on the order of 1-10 sec, which allows for ice crystal growth. For the case where freezing is very rapid, thus providing lots of ice nucleation but not much time for growth, calls for a product "thickness" for example no greater than 1000 μm, or no greater than 100 μm, or no greater than 10 μm.

The melting point of water Tm (K) is lowered by confinement inside a pore texture (for example that present in a polymer hydrogel) and related to the pore radius (nm) according to:

$$r_p = 0.57 - \frac{64.7}{[T_m - 273]}$$

For example, water confined in a 10 nm pore melts at temperatures higher than −7° C. The melting point drops to −14.5° C. when the pore radius decreases to 5 nm.

Preparation of Activated Carbon Materials

As noted above, in one embodiment of the present disclosure a method for making frozen polymer gel particles is provided, wherein the method comprises rapidly freezing polymer gel particles, wherein the polymer gel particles have been generated from a polymer gel, and wherein the polymer gel has been prepared by reaction of one or more polymer precursers.

In further embodiments, the present disclosure provides lyophilizing, pyrolizing, and activating methods. Details of the variable process parameters of the various embodiments of the disclosed methods are described below.

A. Preparation of Polymer Gels

The polymer gel may be provided by co-polymerizing a first precursor and a second precursor in an appropriate solvent. In the case of a polymer hydrogel, the reaction is performed in an aqueous solution. The first precursor may be a phenolic compound and the second precursor may be an aldehyde compound. The solvent may also further comprise a basic catalyst. In one embodiment, of the method, the phenolic compound is resorcinol, catechol, hydroquinone, phloroglucinol, phenol, or a combination thereof; and the aldehyde compound is formaldehyde, acetaldehyde, propionaldehyde, butyraldehyde, benzaldehyde, cinnamaldehyde, or a combination thereof. In a further embodiment, the phenolic compound is resorcinol, phenol or a combination thereof, and the aldehyde compound is formaldehyde. In one embodiment, the basic catalyst is sodium carbonate, sodium bicarbonate, sodium hydroxide, lithium carbonate, lithium bicarbonate, lithium hydroxide, potassium carbonate, potassium bicarbonate, potassium hydroxide, beryllium carbonate, beryllium bicarbonate, beryllium hydroxide, magnesium carbonate, magnesium carbonate, magnesium bicarbonate, magnesium hydroxide, or a combination thereof. In another embodiment, the catalyst is sodium carbonate, sodium bicarbonate, sodium hydroxide or a combination thereof. In a further embodiment, the catalyst is sodium carbonate.

In one embodiment of any of the methods described herein, before freezing, the polymer gel or polymer gel particles are rinsed with water. In one embodiment, the average diameter of said polymer gel particles prior to freezing is less than about 30 mm, for example, between about 0.01 mm and about 25 mm; alternately, the average diameter of said polymer gel particles prior to freezing is between about 0.1 mm and about 10 mm, or about 0.7 mm and about 7 mm. In some examples, the polymer gel particles are between about 2 mm and about 5 mm. In further embodiments, the polymer gel particles are frozen via immersion in a medium having a temperature of below about −10° C., for example, below about −20° C., or alternatively below about −30° C. For example, the medium may be liquid nitrogen or ethanol in dry ice or ethanol cooled by another means. In some embodiments, drying under vacuum comprises subjecting the frozen particles to a vacuum pressure of below about 1400 mTorr.

In another embodiment of the methods described herein, the molar ratio of resorcinol to catalyst is from about 10:1 to about 2000:1 or the molar ratio of resorcinol to catalyst is from about 20:1 to about 200:1. In further embodiments, the molar ratio of resorcinol to catalyst is from about 25:1 to about 100:1. In further embodiments, the molar ratio of resorcinol to catalyst is from about 25:1 to about 50:1. In further embodiments, the molar ratio of resorcinol to catalyst is from about 100:1 to about 50:1.

In yet another embodiment of any of the aspects or variations described herein, the polymer gel is essentially free of organic solvent (i.e. less than 1000 ppm of organic solvent). Generally, the organic solvent is t-butanol or acetone. In one embodiment, the polymer gel contains less than 1000 ppm organic solvent, less than 100 ppm organic solvent, less than 10 ppm organic solvent, or less than 1 ppm organic solvent.

In yet another embodiment of any of the aspect or variations described herein, the polymer gel is essentially free of organic extraction solvent (i.e. less than 1000 ppm of organic extraction solvent). Generally, the organic extraction solvent is t-butanol or acetone. In one embodiment, the polymer gel contains less than 1000 ppm organic extraction solvent, less than 100 ppm organic extraction solvent, less than 10 ppm organic extraction solvent, or less than 1 ppm organic extraction solvent.

Another embodiment of the present disclosure provides a polymer cryogel that is essentially free of organic solvent (i.e. less than 1000 ppm of organic solvent). Generally, the organic solvent is t-butanol or acetone. In one embodiment, the polymer cryogel contains less than 1000 ppm organic solvent, less than 100 ppm organic solvent, less than 10 ppm organic solvent, or less than 1 ppm organic solvent.

Another aspect of the present application is a polymer cryogel that is essentially free of organic extraction solvent (i.e. less than 1000 ppm of organic extraction solvent). Generally, the organic extraction solvent is t-butanol or acetone. In one embodiment, the polymer cryogel contains less than 1000 ppm organic extraction solvent, less than 100 ppm organic extraction solvent, less than 10 ppm organic extraction solvent, or less than 1 ppm organic extraction solvent.

In one embodiment, the polymer cryogel has a BET specific surface area of 100 $m^2/g$ to about 1000 $m^2/g$. Alternatively, the polymer cryogel has a BET specific surface area of between about 150 $m^2/g$ to about 700 $m^2/g$. Alternatively, the polymer cryogel has a BET specific surface area of between about 400 $m^2/g$ to about 700 $m^2/g$.

In one embodiment, the polymer cryogel has a tap density of from about 0.10 g/cc to about 0.60 g/cc. In one embodiment, the polymer cryogel has a tap density of from about 0.15 g/cc to about 0.25 g/cc. In one embodiment, the polymer cryogel has a specific surface area from about 150 $m^2/g$ to about 700 $m^2/g$. In one embodiment of any of the present disclosure, the polymer cryogel has a specific surface area of at least about 150 $m^2/g$ and a tap density of less than about 0.60 g/cc. Alternately, the polymer cryogel has a specific surface area of at least about 250 $m^2/g$ and a tap density of less than about 0.4 g/cc or a specific surface area of at least about 500 $m^2/g$ and a tap density of less than about 0.30 g/cc. In another embodiment of any of the aspects or variations disclosed herein the polymer cryogel comprises a residual water content of less than about 15%, less than about 13%, less than about 10% or less than about 5%.

Polymerization to form a polymer gel can be accomplished by various means described in the art. For instance, polymerization can be accomplished by incubating suitable synthetic polymer precursor materials in the presence of a suitable catalyst for a period of time. The time for polymerization can be a period ranging from hours to days, depending on temperature (the higher the temperature the faster, the reaction rate, and correspondingly, the shorter the time required). The polymerization temperature can range from room temperature to a temperature approaching (but lower than) the boiling point of the starting solution. For example, the temperature can range from about 20° C. to about 90° C. In the specific embodiment of resorcinol, formaldehyde and catalyst, the temperature can range from about 20° C. to about 100° C., typically from about 25° C. to about 90° C. In some embodiments, polymerization can be accomplished by incubation of suitable synthetic polymer precursor materials in the presence of a catalyst for 24 hours at about 90° C. Generally polymerization can be accomplished between about 6 and about 24 hours at about 90° C., for example between about 18 and about 24 hours at about 90° C.

The synthetic polymer precursor materials as disclosed herein include (a) alcohols, phenolic compounds, and other mono- or polyhydroxy compounds and (b) aldehydes, ketones, and combinations thereof. Representative alcohols in this context include straight chain and branched, saturated and unsaturated alcohols. Suitable phenolic compounds include polyhydroxy benzene, such as a dihydroxy or trihydroxy benzene. Representative polyhydroxy benzenes include resorcinol (i.e., 1,3-dihydroxy benzene), catechol, hydroquinone, and phloroglucinol. Mixtures of two or more polyhydroxy benzenes can also be used. Phenol (monohydroxy benzene) can also be used. Representative polyhydroxy compounds include sugars, such as glucose, and other polyols, such as mannitol. Aldehydes in this context include: straight chain saturated aldeydes such as methanal (formaldehyde), ethanal (acetaldehyde), propanal (propionaldehyde), butanal (butyraldehyde), and the like; straight chain unsaturated aldehydes such as ethenone and other ketenes, 2-propenal (acrylaldehyde), 2-butenal (crotonaldehyde), 3 butenal, and the like; branched saturated and unsaturated aldehydes; and aromatic-type aldehydes such as benzaldehyde, salicylaldehyde, hydrocinnamaldehyde, and the like. Suitable ketones include: straight chain saturated ketones such as propanone and 2 butanone, and the like; straight chain unsaturated ketones such as propenone, 2 butenone, and 3-butenone (methyl vinyl ketone) and the like; branched saturated and unsaturated ketones; and aromatic-type ketones such as methyl benzyl ketone (phenylacetone), ethyl benzyl ketone, and the like. The polymer precursor materials can also be combinations of the precursors described above.

The relative amounts of alcohol-containing species (e.g. alcohols, phenolic compounds and mono- or poly-hydroxy compounds or combinations thereof) reacted with the carbonyl containing species (e.g. aldehydes, ketones or combinations thereof) can vary substantially. In some embodiments, the ratio of alcohol-containing species to aldehyde species is selected so that the total moles of reactive alcohol groups in the alcohol-containing species is approximately the same as the total moles of reactive carbonyl groups in the aldehyde species. Similarly, the ratio of alcohol-containing species to ketone species may be selected so that the total moles of reactive alcohol groups in the alcohol containing species is approximately the same as the total moles of reactive carbonyl groups in the ketone species. The same general 1:1 molar ratio holds true when the carbonyl-containing species comprises a combination of an aldehyde species and a ketone species.

The total solids content in the aqueous solution prior to polymer gel formation can be varied. The weight ratio of resorcinol to water is from about 0.05 to 1 to about 0.70 to 1. Alternatively, the ratio of resorcinol to water is from about 0.15 to 1 to about 0.6 to 1. Alternatively, the ratio of resorcinol to water is from about 0.15 to 1 to about 0.35 to 1. Alternatively, the ratio of resorcinol to water is from about 0.25 to 1 to about 0.5 to 1. Alternatively, the ratio of resorcinol to water is from about 0.3 to 1 to about 0.4 to 1.

Examples of solvents useful in the preparation of the activated carbon material disclosed herein include but are not limited to water or alcohol such as, for example, ethanol, t butanol, methanol or mixtures of these, optionally further with water. Such solvents are useful for dissolution of the synthetic polymer precursor materials, for example dissolution of the phenolic compound. In addition, in some processes such solvents are employed for solvent exchange in the polymer gel (prior to freezing and drying), wherein the solvent from the polymerization of the precursors, for example, resorcinol and formaldehyde, is exchanged for a pure alcohol. In one embodiment of the present application, a cryogel is prepared by a process that does not include solvent exchange.

Suitable catalysts in the preparation of polymer gels include basic catalysts that facilitate polymerization of the precursor materials into a monolithic polymer. Suitable catalysts include sodium salts such as sodium carbonate, sodium bicarbonate, and sodium hydroxide. Related mono- and divalent salts can also be employed such as lithium carbonate, lithium bicarbonate, and lithium hydroxide, potassium carbonate, potassium bicarbonate, and potassium hydroxide, beryllium carbonate, beryllium bicarbonate, and beryllium hydroxide, magnesium carbonate, magnesium carbonate, magnesium bicarbonate, and magnesium hydroxide. The catalyst can also comprise various combinations of the catalysts described above. Typically, such catalysts can be used in the range of molar ratios of 20:1 to 200:1 phenolic compound: catalyst. For example, such catalysts can be used in the range of molar ratios of 25:1 to 100:1 phenolic compound: catalyst. In specific embodiments, the catalyst is sodium carbonate.

B. Milling of Polymer Gels

A monolithic polymer gel can be physically disrupted to create smaller particles according to various techniques known in the art. The resultant polymer gel particles generally have an average diameter of less than about 30 mm, for example, in the size range of about 1 mm to about 25 mm, or between about 1 mm to about 5 mm or between about 0.5 mm to about 10 mm. Alternatively, the size of the polymer gel particles can be in the range below about 1 mm, for example, in the size range of about 100 to 1000 microns. Techniques for creating polymer gel particles from monolithic material include manual or machine disruption methods, such as sieving, grinding, milling, or combinations thereof. Such methods are well-known to those of skill in the art. Various types of mills can be employed in this context such as roller, bead, and ball mills.

In a specific embodiment, a roller mill is employed. A roller mill has three stages to gradually reduce the size of the gel particles. The polymer gels are generally very brittle for a 'wet' material and are not damp to the touch. Consequently they are easily milled using this approach, however, the width of each stage must be set appropriately to achieve the targeted final mesh. This adjustment is made and validated for each combination of gel recipe and mesh size. Each gel is milled via passage through a sieve of known mesh size. Sieved particles can be temporarily stored in sealed containers.

Milling can be accomplished at room temperature according to methods well known to those of skill in the art. Alternatively, milling can be accomplished cryogenically, for example by co-milling the polymer gel with solid carbon dioxide (dry ice) particles. In this embodiment, the two steps of (a) creating particles from the monolithic polymer gel and (b) rapid, multidirectional freezing of the polymer gel are accomplished in a single process.

C. Rapid Freezing of Polymer Gels

After the polymer gel particles are formed from the monolithic polymer gel, freezing of the polymer gel particles is accomplished rapidly and in a multi-directional fashion as described in more detail above. Freezing slowly and in a unidirectional fashion, for example by shelf freezing in a lyophilizer, results in dried material having a very low surface area as evidenced in an example herein. Similarly, snap freezing (i.e., freezing that is accomplished by rapidly cooling the polymer gel particles by pulling a deep vacuum) also results in a dried material having a low surface area. As disclosed herein rapid freezing in a multidirectional fashion can be accomplished by rapidly lowering the material temperature to at least about $-10°$ C. or lower, for example, $-20°$ C. or lower, or for example, to at least about $-30°$ C. or lower. Rapid freezing of the polymer gel particles creates a fine ice crystal structure within the particles due to widespread nucleation of ice crystals, but leaves little time for ice crystal growth. This provides a high specific surface area between the ice crystals and the hydrocarbon matrix, which is necessarily excluded from the ice matrix.

D. Drying of Polymer Gels

In one embodiment, the frozen polymer gel particles containing a fine ice matrix are lyophilized under conditions designed to avoid collapse of the material and to maintain fine surface structure and porosity in the dried product. Details of the conditions of the lyophilization are provided herein. Generally drying is accomplished under conditions where the temperature of the product is kept below a temperature that would otherwise result in collapse of the product pores, thereby enabling the dried material to retain an extremely high surface area.

One benefit of having an extremely high surface area in the dried product is the improved utility of the polymer cryogel for the purpose of fabrication of capacitors, energy storage devices, and other energy-related applications. Different polymer cryogel applications require variations in the pore size distribution such as different levels of micropore volume, mesopore volume, surface area, and pore size. By tuning the various processing parameters of the polymer cryogel, high pore volumes can be reached at many different pore sizes depending on the desired application.

The structure of the carbon is reflected in the structure of the polymer cryogel which is in turn is established by the polymer gel properties. These features can be created in the polymer gel using a sol-gel processing approach as described herein, but if care is not taken in removal of the solvent, then the structure is not preserved. It is of interest to both retain the original structure of the polymer gel and modify its structure with ice crystal formation based on control of the freezing process. In some embodiments, prior to drying the aqueous content of the polymer gel is in the range of about 50% to about 99%. In certain embodiments, upon drying the aqueous content of the polymer cryogel is than about 10%, alternately less than about 5% or less than about 2.5%.

Differential scanning calorimetry (DSC) data for a polymer hydrogel demonstrates a large exothermic event at $\sim-18°$ C. (see FIG. 1). These data are consistent with freezing of water inside a pore of $\sim 4$ nm radius. These findings indicate that the extremely rapid freezing for the purposes of the current application not only constitutes a rapid freezing rate, but also that the extent of the decrease is such that the material is brought below at least $-18°$ C.

The DSC data also demonstrate that upon warming, there is a broad, complex endothermic behavior, with the onset about $-13°$ C. and a midpoint of about $-10°$ C. There appears to be a thermal transition at about $-2°$ C., and final melting at about $+1°$ C. The various events may correspond to melting of different types of microstructures. The data suggest that in order to avoid loss of fine product structure in the frozen state, product temperature during initial (e.g., primary) drying should be maintained below $-13°$ C. This is accomplished, for example, in a drying step where heat transfer during primary drying is dominated by convection rather than conduction, thus the product temperature during sublimation will correspond to the temperature of ice at equilibrium with the chamber pressure.

Figure 2:
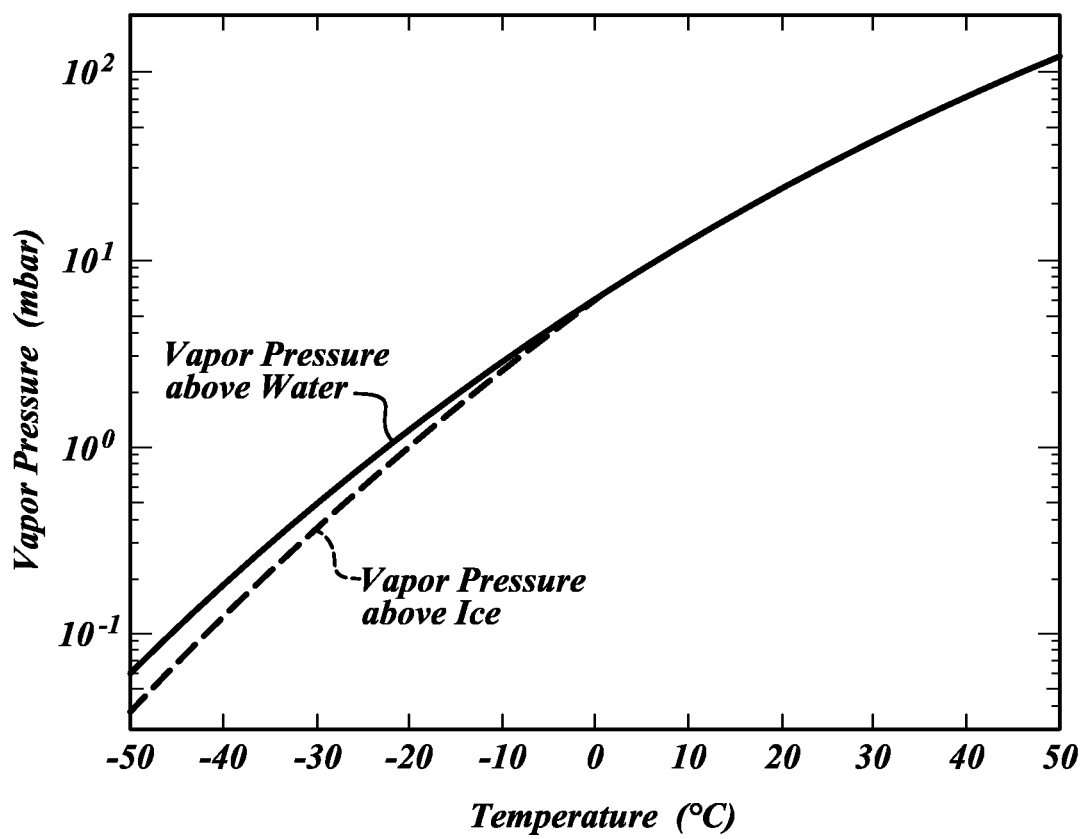
FIG. 2 shows a vapor pressure of ice curve.

FIG. 2 shows a vapor pressure if ice curve. Referring to FIG. 2, a chamber pressure of about 2250 microns results in a primary drying temperature in the drying product of about $-10°$ C. Drying at about 2250 micron chamber pressure or lower case provides a product temperature during primary drying that is no greater than about $-10°$ C. As a further illustration, a chamber pressure of about 1500 microns results in a primary drying temperature in the drying product of about $-15°$ C. Drying at about 1500 micron chamber pressure or lower provides a product temperature during primary drying that is no greater than about $-15°$ C. As yet a further illustration, a chamber pressure of about 750 microns results in a primary drying temperature in the drying product of about $-20°$ C. Drying at 750 micron chamber pressure or lower provides a product temperature during primary drying that is no greater than about $-20°$ C. As yet a further illustration, a chamber pressure of about 300 microns results in a primary drying temperature in the drying product of about −30° C. Drying at 300 micron chamber pressure or lower provides a product temperature during primary drying that is no greater than about −30° C.

E. Pyrolysis and Activation of Polymer Cryogels

The pyrolysis and activation of the freeze dried polymer cryogel can be accomplished by methods described in the art and in more detail below. The porous structure of the resultant activated carbon is reflected in the structure of the dried polymer cryogel, which is in turn established by the polymer gel properties. These features can be created in the polymer gel using a sol-gel processing approach, but if care is not taken during drying (e.g. removal of the solvent, often water), then the structure is not preserved and the desired structural properties are not translated through the pyrolysis and activation processes.

As noted above, another embodiment of the present disclosure provides a method for making an activated carbon material comprising pyrolysis and activation of a cryogel disclosed herein. In some embodiments of the present disclosure, an activated carbon material having a specific surface area of at least about 1000 $m^2/g$ is provided. Alternatively, the activated carbon has a specific surface area of at least about 1500 $m^2/g$. Alternatively, the activated carbon has a specific surface area of at least about 2000 $m^2/g$. Alternately, the activated carbon has a specific surface area of at least about 2500 $m^2/g$. Alternately, the activated carbon has a specific surface area of at least about 3000 $m^2/g$.

Generally, in the pyrolysis process, dried polymer cryogels are weighed and placed in a rotary kiln. The temperature ramp is set at 5° C. per minute, the dwell time and dwell temperature are set; cool down is determined by the natural cooling rate of the furnace. The entire process is usually run under an inert atmosphere, such as a nitrogen environment. Pyrolyzed samples are then removed and weighed. Other pyrolysis processes are well known to those of skill in the art.

In some embodiments, pyrolysis dwell time (the period of time during which the sample is at the desired temperature) is from about 0 minutes to about 120 minutes. In other embodiments, the dwell time is from about 0 minutes to about 60 minutes. In other embodiments, the dwell time is from about 0 minutes to about 30 minutes. In yet other embodiments, the dwell time is from about 0 minutes to about 10 minutes.

In some embodiments, pyrolysis dwell temperature ranges from about 650° C. to 1800° C. In other embodiments pyrolysis dwell temperature ranges from about 700° C. to about 1200° C. In other embodiments pyrolysis dwell temperature ranges from about 850° C. to about 1050° C. In other embodiments pyrolysis dwell temperature ranges from about 800° C. to about 900° C.

Activation time and activation temperature both have a large impact on the performance of the resulting activated carbon material, as well as the manufacturing cost thereof. Increasing the activation temperature and the activation dwell time results in higher activation percentages, which generally correspond to the removal of more material compared to lower temperatures and shorter dwell times. Higher activation often increases performance of the final activated carbon, but it also increases cost by reducing overall yield. Improving the level of activation corresponds to achieving a higher performance product at a lower cost.

Pyrolyzed polymer gels may be activated by contacting the pyrolyzed polymer gel with an activating agent. Many gases are suitable for activating, for example gas which contains oxygen. Non-limiting examples of activating gases comprise carbon dioxide, carbon monoxide, steam, and oxygen. Activating agents may also include corrosive chemicals. Other activating agents are known to those skilled in the art.

In some embodiments, the activation time is from about 1 minute to about 48 hours. In other embodiments, the activation time is from about 1 minute to about 24 hours. In other embodiments, the activation time is from about 5 minutes to about 24 hours. In other embodiments, the activation time is from about 5 minutes to about 5 hours. In other embodiments, the activation time is from about 5 minutes to about 1 hour. In other embodiments, the activation time is from about 5 minutes to about 10 minutes. In other embodiments, the activation time is from about 1 minute to about 10 minutes.

Generally, in the activation process, samples are weighed and placed in a rotary kiln, for which the automated gas control manifold is set to ramp at a 20° C. per minute rate. Carbon dioxide is introduced to the kiln environment for a period of time once the proper activation temperature has been reached. After activation has occurred, the carbon dioxide is replaced by nitrogen and the kiln is cooled down. Samples are weighed at the end of the process to assess the level of activation. Other activation processes are well known to those of skill in the art. In some of the embodiments disclosed herein, activation temperatures may range from about 800° C. to about 1300° C. In another embodiment, activation temperatures may range from about 900° C. to about 1050° C. In another embodiment, activation temperatures may range from about 900° C. to about 1000°. One skilled in the art will recognize that other activation temperatures, either lower or higher, may be employed.

The degree of activation is measured in terms of the mass percent of the pyrolyzed cryogel that is lost during the activation step. In one embodiment of the methods described herein, activating comprises a degree of activation from about 5% to about 90%; or a degree of activation from about 10% to about 80%; in some cases activating comprises a degree of activation from about 40% to about 70%, or a degree of activation from about 50% to about 60%.

In the methods disclosed herein for the production of high surface area activated carbon materials, the polymer gel is engineered to produce a material which is already highly porous and contains within its polymer framework a carbonic structure which, when pyrolyzed and activated, will produce an activated carbon that contains a targeted mix of mesopores and micropores. By producing polymer gel with the appropriate targeted mix of meso- and micro-pores, the amount of required activation is reduced, thereby improving yield and reducing cost. Also, the ability to tune the properties (e.g. pore size) of the intermediates introduces a degree of tuneability that has not been realized by a more traditional approach of pyrolyzing and over-activating existing carbon material. For example, manipulating the processing variables of the intermediates as described herein has a more important impact on the final carbon nanostructure than the traditional methods of adjusting pyrolysis and activation variables.

The ability to scale up a manufacturing approach as disclosed herein to meet the high demand expected for the activated carbon materials disclosed herein has been demonstrated. Three parts of the process can be identified: 1) polymerization from precursor polymer materials; 2) freeze drying; and 3) pyrolysis/activation. In one embodiment, each of these steps may be scaled employing standard manufacturing equipment of three existing industries, for example, specialty chemical companies working with adhesives and epoxies; pharmaceutical and food related freeze drying providers; and manufactures of low grade activated carbon, respectively.

It has been shown that the amount of catalyst and percentage of water in the initial sol has a significant impact on the final performance of the activated carbon material (e.g. when used in a supercapacitor). The large number of process variables and the interaction between these variables enables continuous refinement of the process and allows for some control over the final carbon structure. Accordingly, in one embodiment, the present disclosure provides refinement of the process variables. The disclosed refinements result in an ability to exert control over the final carbon structure in a manner that was previously unobtainable.

The most common approach to refining process variables used in the art is to hold all but one variable constant and determine the effect of varying that one parameter. Alternately, and as described herein, the combination of statistical analysis methods, DFE Pro Software, and a factorial design of experiments approach, were used to systematically vary multiple parameters simultaneously to obtain an optimized process for preparing activated carbon material. By using this approach, the impact of each of these variables on a range of different metrics (e.g. surface area, density, pore volume, etc.) related to the activated carbon material's structure are evaluated. When the activated carbon material is employed in a supercapacitor, additional performance metrics may be evaluated. For example, capacitance, density and power density may be evaluated.

Figure 3A:
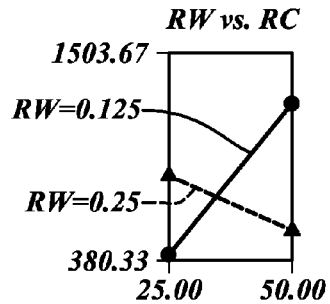
FIG. 3A shows four interaction plots for RC (reactant to catalyst molar ratio) and RW (reactant to water molar ratio) using the Taguchi L12 approach with BET surface area as a response.

FIG. 3 provides a representative sample of three of the variables which have strong, moderate and low interactions. FIG. 3A shows the interaction between RC (resorcinol to catalyst ratio) and RW (resorcinol to water ratio). It is evident that under the appropriate experimental conditions, for an RW of 0.125, the RC 50 value is better, but for an RW value of 0.25, the RC of 25 is better. This is considered a strong interaction; the relationship between RC and RW and other variables can be further controlled according to the approach disclosed herein.

Figure 3B:
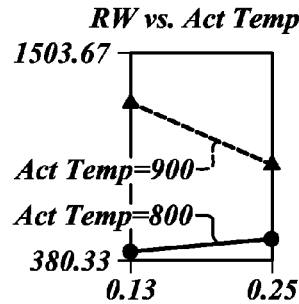
FIG. 3B shows four interaction plots for RW and activation temperature using the Taguchi L12 approach with BET surface area as a response.

FIG. 3B shows the moderate interaction between activation temperature and RW. For low activation temperature, it appears better to have an RW of 0.25, but it also appears that this interaction is generally less important because there is only a slight increase between the values. However, for an activation temperature of 900° C., it is important to choose the lower RW value because there is a decrease in surface area with an increase in RW.

Figure 3C:
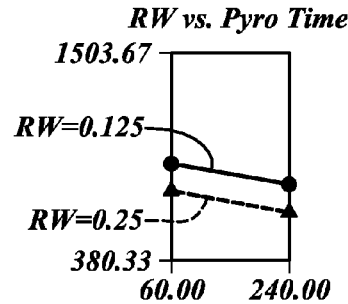
FIG. 3C shows four interaction plots for pyrolysis time and RW using the Taguchi L12 approach with BET surface area as a response.

FIG. 3C shows that there is essentially no interaction between RW and pyrolysis time: for either value of RW it is better to have the low pyrolysis time. This variable interaction analysis provides a wealth of information that can be used to optimize the performance of this system to specific metrics. The ability to tune the pore size and other properties of an activated carbon material by refinement of all the process variables is disclosed in more detail below and in the examples that follow.

Characterization of Cryogels and Activated Carbon Materials

The structural properties of the final activated carbon material, the carbon (e.g. resorcinol/formaldehyde) cryogels, and the pyrolyzed, but unactivated polymer cryogels are measured using Nitrogen sorption at 17K, a method known to those of skill in the art. The final performance and characteristics of the finished activated carbon material is important, but the intermediate products (both polymer cryogel and pyrolyzed, but not activated, polymer cryogel), can also be evaluated, particularly from a quality control standpoint, as known to those of skill in the art. The Micromeretics ASAP 2020 is used to perform detailed micropore and mesopore analysis, which reveals the pore size distribution from 0.35 nm to 50 nm. The system produces a nitrogen isotherm starting at a pressure of 10-7 atm, which enables high resolution pore size distributions in the sub 1 nm range. The software generated reports utilize a Density Functional Theory (DFT) method to calculate properties such as pore size distributions, surface area distributions, total surface area, total pore volume, and pore volume within certain pore size ranges.

The pyrolyzed polymer cryogels may have a surface area from about 100 to about 1200 $m^2/g$. In other embodiments, the pyrolyzed polymer cryogels may have a surface area from about 500 to about 8000 $m^2/g$. In other embodiments, the pyrolyzed polymer cryogels may have a surface area from about 500 to about 600 $m^2/g$.

The pyrolyzed polymer cryogels may have a tap density from about 0.1 to about 1.0 cc/g. In other embodiments, the pyrolyzed polymer cryogels may have a tap density from about 0.4 to about 0.6 cc/g. In other embodiments, the pyrolyzed polymer cryogels may have a tap density from about 0.45 to about 0.5 cc/g.

Tuning the Pore Size and Other Properties of Polymer Cryogels

As noted above, activated polymer cryogels synthesized from synthetic, well-characterized precursors are different from activated carbon from natural sources such as coal, pitch, coconuts, etc. This is due in part to the fact that they can be tuned in both micropore and mesopore structure and chemistry by carefully predesigned and executed processing controls. Additionally, an activated polymer cryogel as described herein can contain a porous structure which can be optimized for a given application (e.g. when used in a supercapacitor or other energy storage device). With the ability to tune the carbon nanostructure, performance exceeding current performance data from traditional activated carbons is attained. Important variables include large accessible surface area, short micropores for electrolytic salt diffusion, and minimization of wasted pore volume to enhance specific capacitance.

As noted above, manipulation of the process variables allows production of activated carbons that have properties that suits the desired application. Accordingly, in one embodiment a method of optimizing the process variables for production of polymer gels, polymer cryogels, pyrolyzed polymer cryogels and activated polymer cryogels is provided. As described in more detail in the examples that follow, one approach for optimization of process parameters comprises a design of experiments strategy. Using this strategy, the influence of multiple process variables (e.g. up to 8 variables) can be studied with relatively few experiments. The data obtained from the design of experiments can be used to manipulate process variables to obtain specific properties in the polymer gels, polymer cryogels, and activated polymer cryogels. For example, in some embodiments, the process parameters which are manipulated to obtain the desired product characteristics are selected from: Resorcinol/Catalyst Ratio, Resorcinol/Water Ratio, Particle Size at Freezing Step, Quench Temperature, Pyrolysis Time, Pyrolysis Temperature, Activation Temperature, and Activation Time and combinations thereof.

EXAMPLES

The polymer gels, cryogels, pyrolyzed cryogels, and activated carbon materials disclosed in the following Examples were prepared according to the methods disclosed herein. The following chemicals were used in their preparation: resorcinol (99+%, Sigma-Aldrich), formaldehyde solution (37%—stabilized with methanol, Fisher Scientific), sodium carbonate (99.5%, Sigma-Aldrich). The chemicals were used as received from the supplier without further purification.

Unless indicated otherwise, the following conditions were generally employed. Resorcinol and formaldehyde were reacted in water in the presence of a sodium carbonate catalyst. The molar ratio of resorcinol to formaldehyde was typically 0.5 to 1. The reaction was allowed to incubate in a sealed glass ampoule at 90° C. for at least 24 hours or until gelation was complete. The resulting polymer hydrogel contained water, but no organic solvent; the polymer hydrogel was optionally washed with water to remove unreacted precursors, but was not subjected to solvent exchange of water for an organic solvent, such as t-butanol. The polymer hydrogel monolith was then physically disrupted, for example by milling, to form polymer hydrogel particles having an average diameter of less than about 30 mm. Unless stated otherwise, the particles were then rapidly frozen, generally by immersion in a cold fluid (e.g. liquid nitrogen or ethanol/dry ice) and lyophilized. Generally, the lyophilizer shelf was pre-cooled to −50° C. before loading a tray containing the frozen polymer hydrogel particles on the lyophilizer shelf. The chamber pressure for lyophilization was typically in the range of 50 to 1000 mTorr and the shelf temperature was in the range of +10 to +25° C. Alternatively, the shelf temperature can be set lower, for example in the range of 0 to +10 C. Alternatively, the shelf temperature can be set higher, for example in the range of 25 to +40 C.

The dried polymer hydrogel was typically pyrolyzed by heating in a nitrogen atmosphere at temperatures ranging from 1000-1200° C. for a period of time as specified in the examples. Activation conditions generally comprised heating a pyrolyzed polymer hydrogel in a $CO_2$ atmosphere at temperatures ranging from 900-1000° C. for a period of time as specified in the examples. Specific pyrolysis and activation conditions were as described in the following examples.

Example 1

Pore Size Distribution of Dried RF Cryogel and an Activated Carbon

Figure 4:
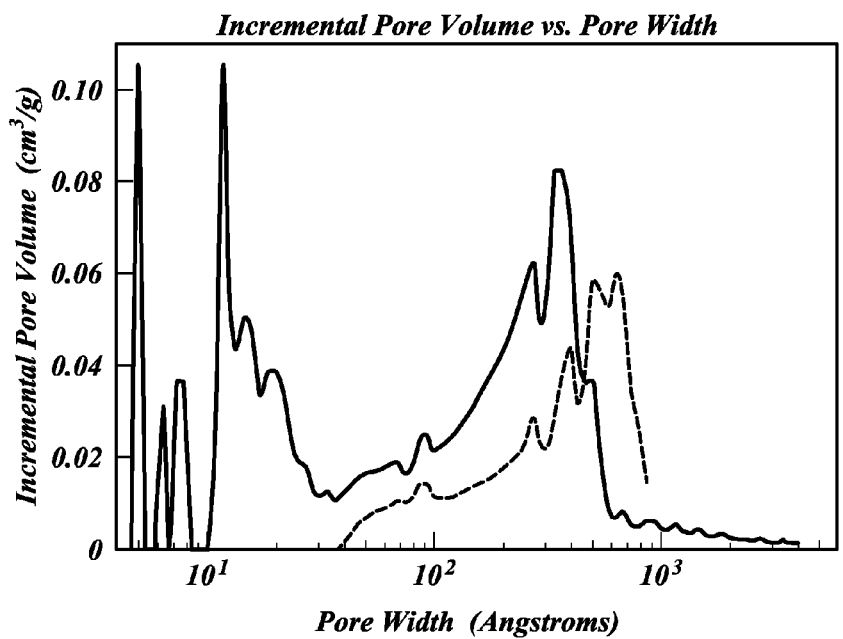
FIG. 4 depicts representative pore size distribution for a cryogel (dashed line) and for an activated carbon (solid line).

FIG. 4 shows the pore size distribution of a representative RF cryogel (dashed line) and an activated carbon prepared from the same RF cryogel (solid line). FIG. 2 shows that the larger pores in the RF cryogel are carried over to the resulting activated carbon. This behavior provides an opportunity to control the larger pores in the activated carbon material through the chemistry and processing of the precursor gel. The data in FIG. 2 also demonstrate that the activation step opens the microporosity and thus provides an opportunity for independent control of this parameter.

Figure 5:
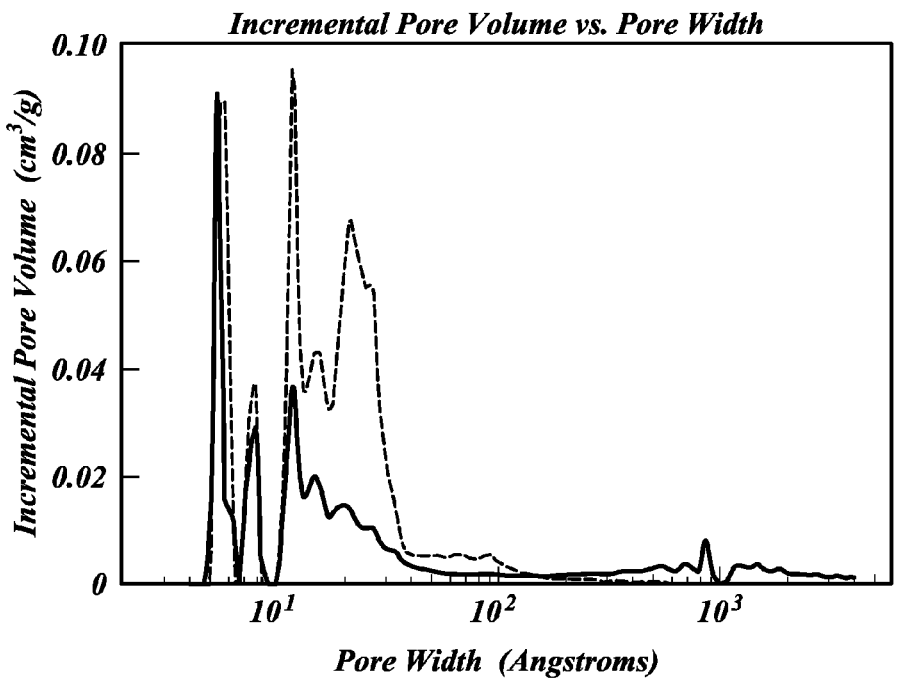
FIG. 5 depicts pore size distribution in an activated carbon for different levels of activation. The solid line is the case of lower activation (i.e., shorter dwell time) compared to the dashed line representing the case of higher activation (e.g., longer dwell time).

FIG. 5 compares the pore size distribution for two activated carbons that were prepared from two different dried RF hydrogels. Specifically, the dashed curve represents data for an activated polymer cryogel prepared from a reaction solution having an RC of 50 and RW of 0.35, the resulting cryogel, which had a specific surface area of 603 $m^2/g$, was pyrolyzed for 6 min at 1000° C. and activated for 30 min at 1000° C. The total BET specific surface area for the resultant activated carbon was 2186 $m^2/g$.

The solid curve in FIG. 5 represents data for an activated polymer cryogel prepared from a reaction solution having an RC of 50 and RW of 0.15, the resulting cryogel, which had a specific surface area of 478 $m^2/g$, was pyrolyzed for 6 min at 1200° C. and activated for 8 min at 900° C. The total BET specific surface area for the resultant activated carbon was 1116 $m^2/g$. As shown in FIG. 5, activation conditions did significantly change the pore size distribution below 10 Å, but the distribution slightly above 10 Å was enhanced by increased activation. A similar trend is observed for the sizes in the range of 20 to 40 Å. Accordingly, FIGS. 4 and 5 demonstrate that appropriate process control can tune the pore size distributions.

Example 2

Taguchi L-18 Experimental Design Program to Illustrate Control of Product Characteristics Via Processing Parameters A Taguchi L-18 experimental design program was executed to study the following 8 factors relating to the processing of high surface area activated carbon from resorcinol-formaldehyde (RF) polymers: Resorcinol/Catalyst Ratio ("RC Ratio": 3 levels), Resorcinol/Water Ratio ("RW Ratio": three levels), Particle Size at Freezing Step ("Sieving Size": 3 levels), Quench Temperature ("Freezing Method": 3 levels), Pyrolysis Time (2 levels), Pyrolysis Temperature (2 levels), Activation Temperature (3 levels), and Activation Time (3 Levels). The specific experimental plan as executed is presented in Table 1.

TABLE 1

Experimental parameters used to create a Taguchi L-18 experimental design

| Run # | Pyrolysis Time (Min) | Pyrolysis Temp (C.) | Act. Time (Min) | Act. Temp (C.) | RC Ratio | RW Ratio | Sieve Size | Freeze Method |
|---|---|---|---|---|---|---|---|---|
| 1 | 6 | 1000 | 5 | 900 | 25 | 0.15 | 1 | A |
| 2 | 6 | 1000 | 7.5 | 950 | 37.5 | 0.25 | 2 | B |
| 3 | 6 | 1000 | 10 | 1000 | 50 | 0.35 | 3 | C |
| 4 | 6 | 1100 | 5 | 900 | 37.5 | 0.25 | 3 | C |
| 5 | 6 | 1100 | 7.5 | 950 | 50 | 0.35 | 1 | A |
| 6 | 6 | 1100 | 10 | 1000 | 25 | 0.15 | 2 | B |
| 7 | 6 | 1200 | 5 | 950 | 25 | 0.35 | 2 | C |
| 8 | 6 | 1200 | 7.5 | 1000 | 37.5 | 0.15 | 3 | A |
| 9 | 6 | 1200 | 10 | 900 | 50 | 0.25 | 1 | B |
| 10 | 60 | 1000 | 5 | 1000 | 50 | 0.25 | 2 | A |
| 11 | 60 | 1000 | 7.5 | 900 | 25 | 0.35 | 3 | B |
| 12 | 60 | 1000 | 10 | 950 | 37.5 | 0.15 | 1 | C |
| 13 | 60 | 1100 | 5 | 950 | 50 | 0.15 | 3 | B |
| 14 | 60 | 1100 | 7.5 | 1000 | 25 | 0.25 | 1 | C |
| 15 | 60 | 1100 | 10 | 900 | 37.5 | 0.35 | 2 | A |
| 16 | 60 | 1200 | 5 | 1000 | 37.5 | 0.35 | 1 | B |
| 17 | 60 | 1200 | 7.5 | 900 | 50 | 0.15 | 2 | C |
| 18 | 60 | 1200 | 10 | 950 | 25 | 0.25 | 3 | A |

Notes for Table 1:
Factor 1 = pyrolysis time, Factor 2 = pyrolysis temperature, Factor 3 = activation time, Factor 4 = activation temperature, Factor 5 = R/C, Factor 6 = R/W, Factor 7 = Sieving size (1 = 0.71 to 1 mm, 2 = 2-4.75 mm, 3 = 5.6-6.7 mm), Factor 8 = freezing method (A = immersion in −30° C. ethanol, B = immersion in −77° C. ethanol, C = immersion in −196° C. liquid nitrogen).

The density of the RF hydrogel was measured by the immersion technique, known to those of skill in the art. The influence of the ratios of Resorcinol to Water (R/W) and Resorcinol to Catalyst (R/C) on the RF hydrogel density were examined. The R/W ratio was the dominant contributor with a minor effect of higher density with increasing catalyst, especially in the low water region. The cured gel density correlated well with the gel water content as indicated by the total weight loss on air drying. Additionally, the weight loss on freeze drying increased with the increasing water content of the initial gel. The weight loss for both air drying and lyophilization were in reasonable agreement, indicating that the freeze dry process was effective in removing water.

The specific surface area of the freeze-dried gels was quite high—averaging 552 m²/gm. Without being bound by theory, it is expected that the surface area of the air-dried gels would be very low as a result of pore collapse. The density measurement and air drying step can be used as rapid predictors of the water removal required in the freeze drying step.

Pyrolysis was carried out in nitrogen at 1000° C., 1100° C. and 1200° C. for either 6 or 60 minutes. The average weight loss of the dry gel upon pyrolysis was 45.6 percent with a standard deviation of 1.20, indicating that the pyrolysis step can be completed at a relatively low temperature in a short time. There was a general trend of increasing weight loss with time and temperature. Losses upon activation ranged from 30% to 90%. These data demonstrate the balance achieved among product yield (i.e., activation weight loss) and activation temperature and dwell time.

Figure 6:
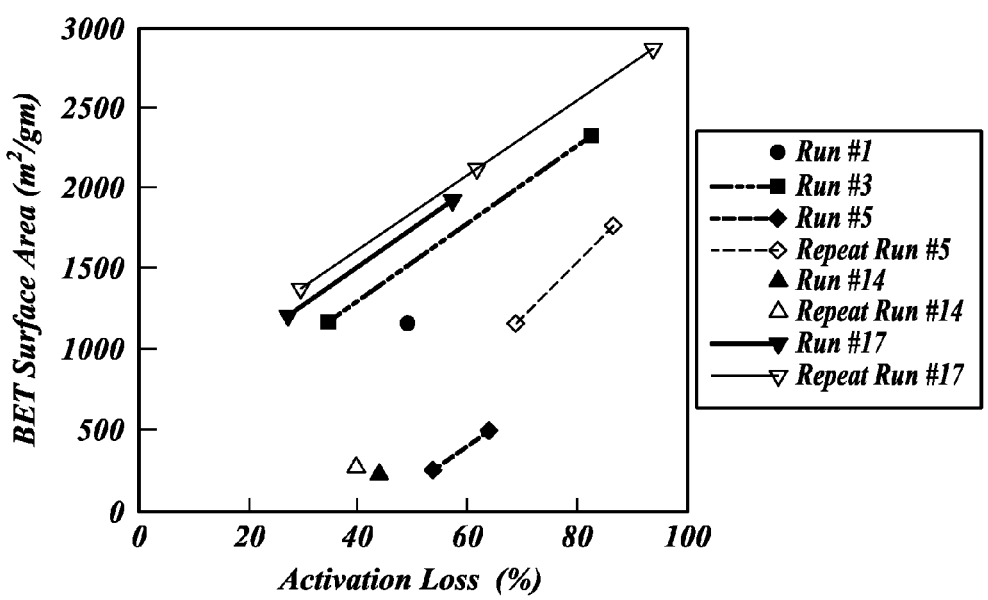
FIG. 6 presents BET specific surface area versus activation weight loss under $CO_2$ for various samples, as described in Table 1 as indicated in the legend.

To demonstrate control over the activation weight loss, a Y bar marginal means plot was constructed for the eight different input variables at three levels each (low, middle, high) as described in Table 2. Weight loss upon activation was chosen as the response parameter in this example because it is an indicator of the activated carbon surface area, as previously discussed. The regression analysis showed that the most significant factors related to weight loss are activation time and activation temperature.

and about 60 minutes. The data indicate that a significant parameter relating to BET surface area is the burn-off or weight loss in the activation step. FIG. 6 is a summary of the activation versus BET results for a number of samples identified in Table 1.

Two general classes of activated RF materials were identified in the present experiments:

1. Materials that had high weight loss at short activation times (40 to 50% in 5 to 10 minutes) relative to their BET surface area. These materials in the lower portion of FIG. 4 are inferior electrode candidates compared to other samples shown in FIG. 4 because of their low BET surface area for a relatively high activation weight loss. For example, Run #5 resulted in materials with a specific surface area of only about 500 m²/g or less after 60% activation weight loss, and only about 1500 m²/g after about 80% weight loss.
2. Materials that had low weight loss at short activation times (20 to 30% in 5 to 10 minutes) but developed relatively high surface area (in the range of 1000 to 1500 m²/gm). For example the lines corresponding to Run #17 and Run #3 represent materials that achieve a surface area of at least about 2000 m²/gm with about 60% activation weight loss.

TABLE 2

Screening factors and levels for the Y bar marginal means plot

| | FACTOR | | | | | | |
|---|---|---|---|---|---|---|---|
| A Pyrolysis Time | B Pyrolysis Temp | C Activation Time | D Activation Temp | E R/C | F R/W | G Particle Size | H Quench |
| Low 6 min | 1000 C. | 5 min | 900 C. | 25 | 0.15 | Small | −30 C. |
| Medium NA | 1100 C. | 8 min | 950 C. | 37 | 0.25 | Medium | −60 C. |
| High 60 min | 1200 C. | 10 min | 1000 C. | 50 | 0.35 | Large | −196 C. |

The ability to adjust the pore size distribution of the samples for pores smaller than 5 nm is related to the performance of the activated carbon for its intended utility, for example, use in electrodes for ultracapacitors. These pore size distributions demonstrate an ability to adjust the pore volume in certain ranges. As a specific illustration, consider the incremental pore volume data for various activated carbons generated as part of the Taguchi L-18 experimental design program. The dashed line in FIG. 3 (representing Run #3 from Table 1) has a peak for pores having a width at just over 20 Angstroms as well as a peak for pores having a width just larger than 10 Angstroms. These pores are in the size range that would be useful for ion penetration, such as in an ultracapacitor. Other pore sizes will have alternative applications, for example, for different sized ion penetration. These data illustrate how different processing parameters provide different pore size distribution in the activated carbons, and depending on the particular pore size(s) required for a particular application, the process parameters can be tuned to provide peak pore volumes in the desired peak pore sizes.

The amount of surface area of a carbon material measured by BET is a primary indicator of its potential performance for a given application, for example as an electrode in a supercapacitor. In addition, the parameters of the activation step are the most important contributors to high surface area. For the present experiments, the carbon activation step was conducted and evaluated at temperatures between 900° C. and 1200° C. and under $CO_2$ exposure times of between about 6

Figure 7:
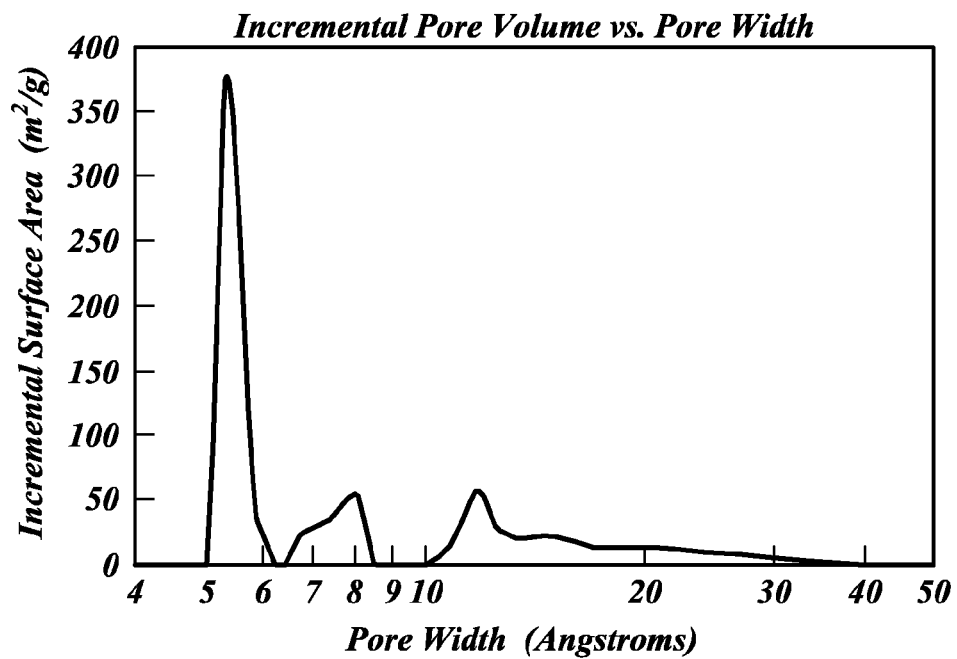
FIG. 7 presents the surface area as a function of pore size for activated carbon (representing Run #14 from Table 1).
Figure 8:
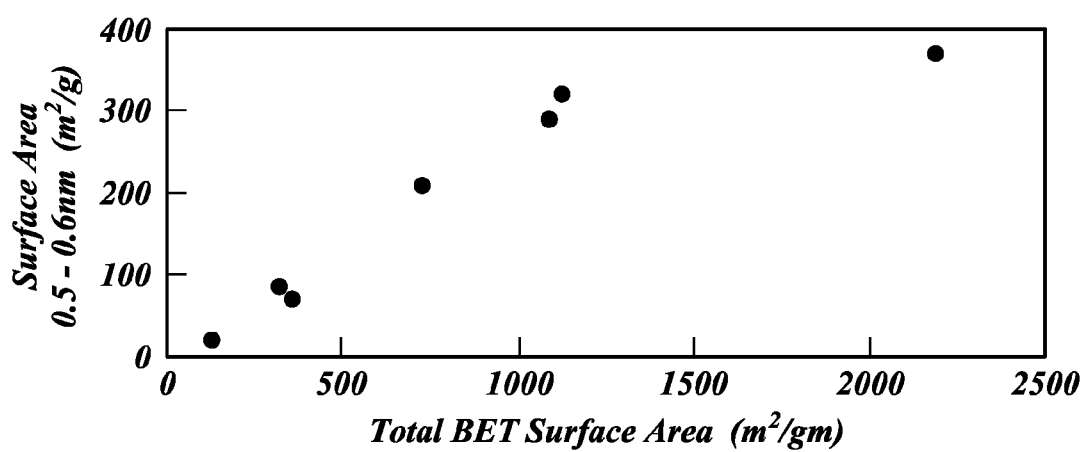
FIG. 8 presents the surface area of pores between 0.5 and 0.6 nm in relation to total measured BET surface area for an activated carbon.

The micropore distributions for activated carbons produced according to seven of the initial Taguchi L18 design parameters were measured. FIG. 7 shows a representative distribution curve for the surface area as a function of pore size for a sample activated to 2186 m²/gm (Run #3 from Table 1). FIG. 8 shows the relationship between surface area in the range between 5 and 6 Angstroms (0.5-0.6 nm) pore width vs. total surface area. These data demonstrate that as total surface area increases, the surface area of the range of pore width between 5-6 Angstroms increases.

Activated carbon material produced from one of the compositions from Table 1 (Run #17) was chosen for further evaluation. The results of this study are depicted in FIG. 9A, FIG. 9B and FIG. 9C, which are graphs of surface area vs. pore size distribution for activated carbons made from the same dried polymer RF gels but activated under different process conditions as described below.

Figure 9A:
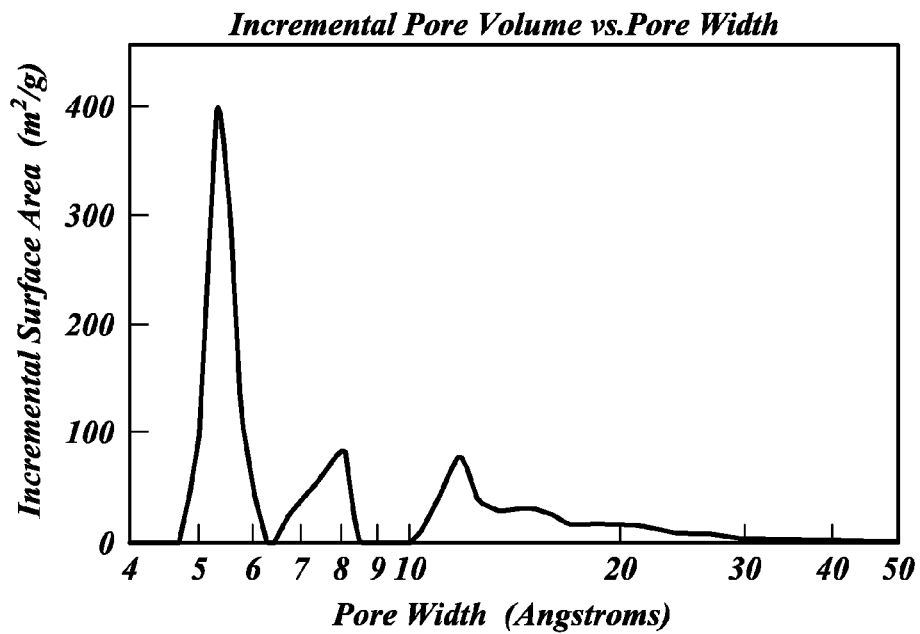
FIG. 9A is a graph of surface area as a function of pore size for activated carbon prepared from cryogel that was pyrolyzed at a dwell time of 60 min at 1200° C. under nitrogen gas flow conditions and subsequently activated for a dwell time of 10 min at 900° C. under $CO_2$ gas flow conditions.
Figure 9B:
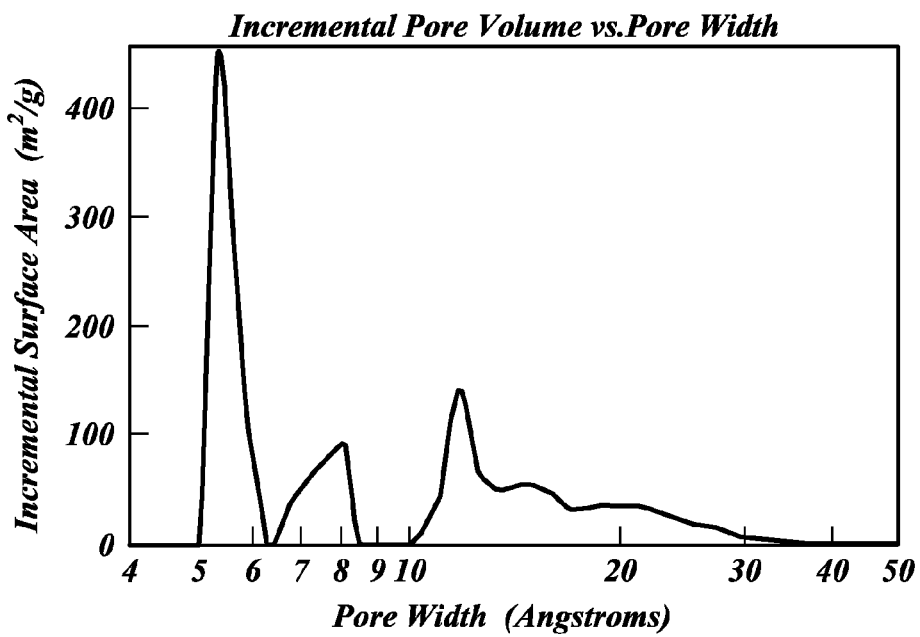
FIG. 9B is a graph of surface area as a function of pore size for activated carbon prepared from cryogel as described in FIG. 7A, except the activated carbon sample was further activated for a dwell time of an additional 4 min at 900° C. under $CO_2$ gas flow conditions.
Figure 9C:
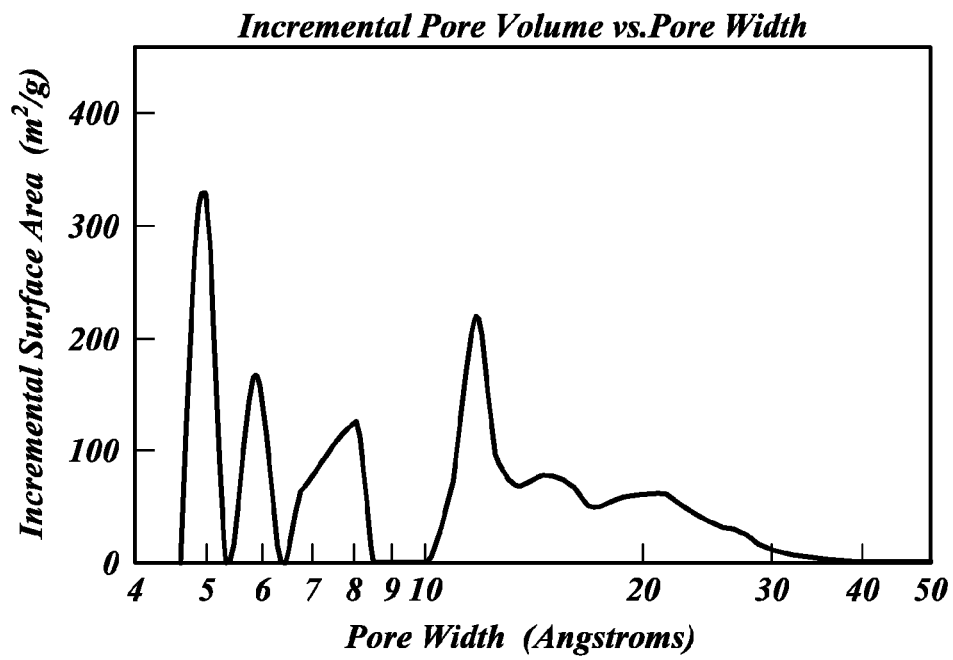
FIG. 9C is a graph of surface area as a function of pore size for activated carbon prepared from a cryogel that was pyrolyzed at a dwell time of 60 min at 900° C. under nitrogen gas flow and directly subjected to activation for a dwell time of 14 min at 900° C. under $CO_2$ flow conditions.

The curve shown in FIG. 9A corresponds to material pyrolyzed for 60 min at 1200° C. and activated for 10 min at 900° C. to yield a BET surface area of 1376 m²/gm. The typical large surface area peak between 0.5 and 0.6 nm as depicted in FIG. 5 is also present in this sample. In addition, significant well-defined surface area peaks are present at pore sizes between 0.7 and 0.8 nm and also at 1.2 nm. Re-activation of this same sample to a BET surface area of 2106 m²/gm (curve shown in FIG. 9B) maintained the same peak distribution but uniformly increased the peak height over the entire size range.

In the case of the curve shown in FIG. 9C, the pyrolysis and activation conditions were modified as follows: pyrolysis for 60 min at 900° C. followed directly by in situ activation for 14 min at 900° C. This resulted in activation to 2930 m²/gm. The resulting surface area/pore size distribution was significantly changed from the earlier processing conditions. The peak heights at pore sizes 0.7 nm to 0.8 nm and at 1.2 nm were higher, consistent with the increased total BET surface area. However, the peak centered at 5.5 nm disappeared and was replaced by two large peaks—one centered at 0.5 nm and the other at 0.59 nm.

Example 3

Control of Dried RF Hydrogel Characteristics and Drying Time as a Function of Freeze Drying Variables An RF hydrogel was prepared and sieved by hand to create polymer hydrogel particles as described below. The polymer hydrogel particles were frozen by gradually dropping the material into a stainless steel beaker containing liquid nitrogen. Once the entire sample was completely frozen, the frozen slurry of particles in liquid nitrogen was carefully poured into an 8-inch pan, which had been pre-cooled with liquid nitrogen, and the pan was placed on a lyophilization shelf (typically pre-cooled to at least −30° C.).

For each freeze drying run in which a combination of shelf temperature and chamber pressure were tested, three samples were generated with different loadings and sieving. Two thermocouples were placed within each sample, with care taken to place thermocouples in the center, bottom of each sample, preferably without having the thermocouple directly contacting the pan. After the majority of liquid nitrogen boiled off from the samples loaded in the lyophilizer (as ascertained by visual inspection), the lyophilizer doors were sealed and vacuum pump started.

Samples were harvested after product thermocouples were within 2° C. of the lyophilizer shelf. For runs conducted at a shelf temperature of +10° C., the shelf was raised to +25° C. for at least an hour prior to harvest to avoid possible condensation on the dried product. For the purpose of statistical modeling, drying time was defined as the time for all product thermocouples to reach at least within 2° C. of the shelf temperature. An alternate analysis was conducted using an alternative definition for drying time as the time for all product thermocouples to reach at least within 4° C. of the shelf temperature. The typical outputs (characteristics measured) were visual appearance (e.g., color) and low magnification stereomicroscopy, product yield (weight loss), tap density, and specific surface area.

A custom design of experiments (DOE) approach was employed to examine the effect of various input factors on the output. The input factors examined were: sample loading/depth (two levels: 2 and 4 g/in²), gel particle/sieving size (2 levels: 2000 microns and 4750 microns), shelf temperature setpoint (2 levels: 10° C. and 25° C.), and chamber pressure setpoint (4 levels: 100, 300, 700, and 1000 mTorr). In general, the actual measured chamber pressures and shelf temperatures were close to the intended setpoint. Additional runs were conducted in duplicate at a chamber pressure setpoint of 50 mTorr and shelf temperature setpoint of +10° C. However, in this case, during the primary drying phase (first several hours of drying) the actual measured pressure was higher than the intended setpoint, with a reading spiking to a level in the range of 200-250 mTorr. A total of 11 runs are included herein, with three samples per run and two thermocouples in each sample to provide a grand total of 66 data points for the statistical analysis. A summary of all samples and drying data is provided in Table 3.

TABLE 3

Summary of Freeze Drying Data

| Sample | Shelf Temperature (° C.) | Chamber Pressure (mTorr) | Product Loading (g/in²) | Sieving Size (um) | Time (h) to 2° C. of shelf | Time (h) to 4° C. of shelf |
|---|---|---|---|---|---|---|
| 015-1 | 10 | 50 | 2 | 4750 | 8.0 | 7.7 |
|  |  |  |  |  | 8.6 | 8.0 |
| 015-2 |  |  | 4 |  | 17.0 | 15.4 |
|  |  |  |  |  | 17.3 | 16.1 |
| 015-3 |  |  | 4 | 2000 | 18.1 | 17.4 |
|  |  |  |  |  | 18.9 | 17.8 |
| 016-1 | 10 | 50 | 2 | 4750 | 9.8 | 8.9 |
|  |  |  |  |  | 9.9 | 9.0 |
| 016-2 |  |  | 4 |  | 16.9 | 16.2 |
|  |  |  |  |  | 17.9 | 16.9 |
| 016-3 |  |  | 4 | 2000 | 17.6 | 17.1 |
|  |  |  |  |  | 18.5$^c$ | 17.7 |
| 008-1 | 10 | 100 | 2 | 4750 | 7.7 | 6.8 |
|  |  |  |  |  | 8.3 | 8.1 |
| 008-2 |  |  | 4$^d$ |  | 20.1 | 15.3 |
|  |  |  |  |  | 20.8 | 15.6 |
| 008-3 |  |  | 4 | 2000 | 13.8 | 13.0 |
|  |  |  |  |  | 15.4 | 14.2 |
| 006-1 | 10 | 300 | 2 | 4750 | 12.6 | 9.1 |
|  |  |  |  |  | 14.0 | 8.9 |
| 006-2 |  |  | 4 |  | 16.2 | 15.6 |
|  |  |  |  |  | 17.4 | 16.2 |
| 006-3 |  |  | 4 | 2000 | 14.2 | 13.1 |
|  |  |  |  |  | 15.8 | 15.1 |
| 005-1 | 10 | 700 | 2 | 4750 | 12.2 | 11.1 |
|  |  |  |  |  | 12.5 | 10.9 |
| 005-2 |  |  | 4 |  | 16.4 | 15.5 |
|  |  |  |  |  | 15.5 | 14.4 |
| 005-3 |  |  | 4 | 2000 | 13.4 | 13.2 |
|  |  |  |  |  | 13.3 | 12.9 |
| 007-1 | 10 | 1000 | 2 | 4750 | 8.8 | 8.1 |
|  |  |  |  |  | 9.9 | 8.2 |
| 007-2 |  |  | 4 |  | 16.3 | 15.9 |
|  |  |  |  |  | 16.5 | 16.1 |
| 007-3 |  |  | 4 | 2000 | 13.5 | 13.1 |
|  |  |  |  |  | 13.7 | 13.4 |
| 009-1 | 25 | 100 | 2 | 4750 | 12.1 | 7.4 |
|  |  |  |  |  | 12.7 | 7.5 |
| 009-2 |  |  | 4 |  | 13.8 | 12.7 |
|  |  |  |  |  | 14.0 | 12.9 |
| 009-3 |  |  | 4 | 2000 | 13.9 | 13.3 |
|  |  |  |  |  | 13.3 | 12.1 |
| 014-1 | 25 | 300 | 2 | 4750 | 8.7 | 5.8 |
|  |  |  |  |  | 10.4 | 5.9 |
| 014-2 |  |  | 4 |  | 13.0 | 11.5 |
|  |  |  |  |  | 13.0 | 12.1 |
| 014-3 |  |  | 4 | 2000 | 12.3 | 11.9 |
|  |  |  |  |  | 12.0 | 11.4 |
| 013-1 | 25 | 700 | 2 | 4750 | 10.5 | 6.9 |
|  |  |  |  |  | 11.1 | 7.2 |
| 013-2 |  |  | 4 |  | 12.3 | 10.8 |
|  |  |  |  |  | 12.4 | 11.3 |
| 013-3 |  |  | 4 | 2000 | 12.9 | 11.4 |
|  |  |  |  |  | 13.1 | 12.1 |
| 012-1 | 25 | 1000 | 2 | 4750 | 10.4 | 7.0 |
|  |  |  |  |  | 11.2 | 7.3 |
| 012-2 |  |  | 4 |  | 12.4 | 11.2 |
|  |  |  |  |  | 12.5 | 12.0 |
| 012-3 |  |  | 4 | 2000 | 11.9 | 10.9 |
|  |  |  |  |  | 11.6 | 10.3 |

The data for time to dry was modeled as a linear regression of the sum of the products of the various process inputs (product loading, sieving size, shelf temperature, chamber pressure) and their fitted coefficient and p values. Table 4 presents a summary of the model for freeze drying time defined as time for product thermocouples to reach within 2°

C. of shelf. The model gave a reasonable fit with $R^2=0.6523$ and $F=28.6$ (note that according to the software, $F>6$ indicates a significant model for prediction). The model suggests that product load, shelf temperature, and chamber pressure are highly significant ($p<0.05$) in terms of their influence on the output of drying time, and sieving size is somewhat significant ($p=0.0606$). Positive coefficients for product load and sieving size suggest that drying time increases when these variables increase. Negative coefficients for chamber pressure and shelf temperature suggest that drying time decreases when these variables increase.

TABLE 4

Summary of Model for Freeze Drying Time
(to within 2° C. of the Shelf)

| Name | Coefficient | P(2 Tail) |
|---|---|---|
| Constant | +11.979 | 8.8E-46 |
| Product loading | +2.584 | 5.1E-13 |
| Shelf temperature | −0.87483 | 0.0008 |
| Chamber pressure | −0.6798 | 0.0387 |
| Sieving size | +0.54091 | 0.0606 |

Table 5 presents a summary of the model for freeze drying time defined as time for product thermocouples to reach within 4° C. of shelf. The model gave a reasonable fit with $R^2=0.8648$ and $F=97$ (note that according to the software, $F>6$ indicates a significant model for prediction). The model suggests that product load, and shelf temperature are highly significant ($p<0.05$) in terms of their influence on the output of drying time, and chamber pressure is somewhat significant ($p=0.0543$). Positive coefficients for product load and sieving size suggest that drying time increases when these variables increase. Negative coefficients for chamber pressure and shelf temperature suggest that that drying time decreases when these variables increase.

TABLE 5

Summary of Model for Freeze Drying Time
(to within 4° C. of the Shelf)

| Name | Coefficient | P(2 Tail) |
|---|---|---|
| Constant | +10.351 | 5.8E-52 |
| Product loading | +3.048 | 2.7E-23 |
| Shelf temperature | −1.319 | 7.6E-11 |
| Chamber pressure | −0.42906 | 0.0543 |
| Sieving size | +0.21818 | 0.2610 |

Therefore, both models provide a similar conclusion that to decrease drying time, it is beneficial to maximize shelf temperature and chamber pressure, and minimize the sieving size and product load.

A summary of the characteristics of the various dried polymer gels is provided in Table 6. The product yields were very consistent among the various samples, ranging from 78-81%, with an average of about 81%. The measured tap densities ranged from about 0.15 to about 0.27 cc/g (average=0.191 cc/g, standard deviation=0.032 cc/g). The various samples were analyzed for BET specific surface area. As the first step in the procedure, the samples were de-gassed. The weight loss for the various samples upon degassing ranged from 2.5% to 12.3% (average=5.7%, standard deviation=2.1%). Presumably, this variability in weight loss upon degassing illustrated the variation in residual moisture in the various samples after freeze drying and storage prior to the BET analysis. There is no obvious pattern between the weight loss upon degassing and other dried polymer gel characteristics or the lyophilization conditions tested.

Figure 10:
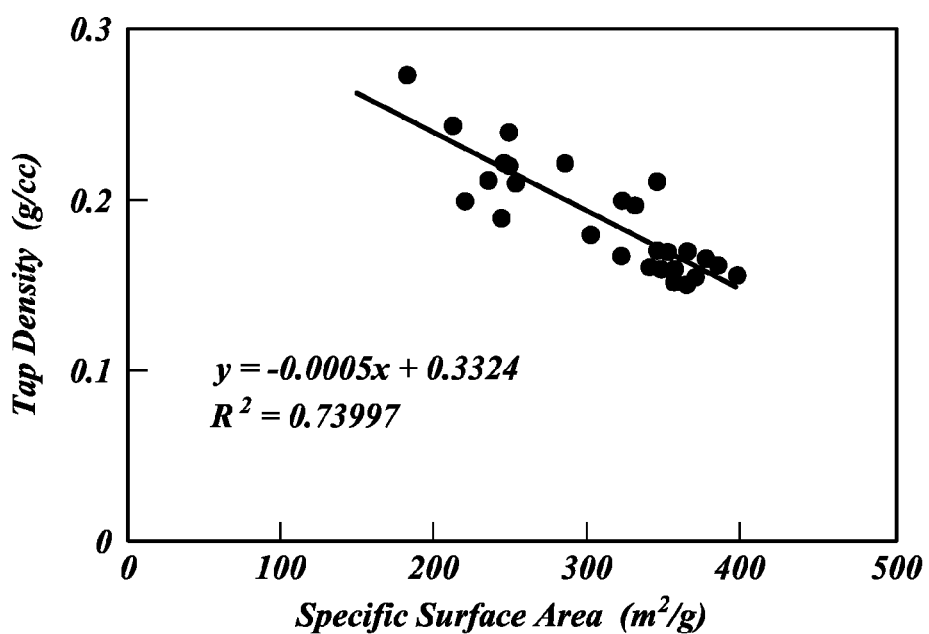
FIG. 10 is a graph of tap density vs. specific surface area for various lyophilized polymer gels (data from Table 6).

A graph of the tap density vs. the specific surface area is presented in FIG. 10. The data show the general correlation that tap density decreases with increasing specific surface area ($R^2=0.74$). The relationship is logical considering that particles with higher specific surface area (and correspondingly higher specific pore volume) will have a lower envelope density, which would translate into a lower tap density for a given dried particle size.

There was a general trend that higher product loading and lower sieving size resulted in lower specific surface area. This trend is more evident when analyzing a particular experiment (where chamber pressure and shelf temperature are fixed).

Figure 11:
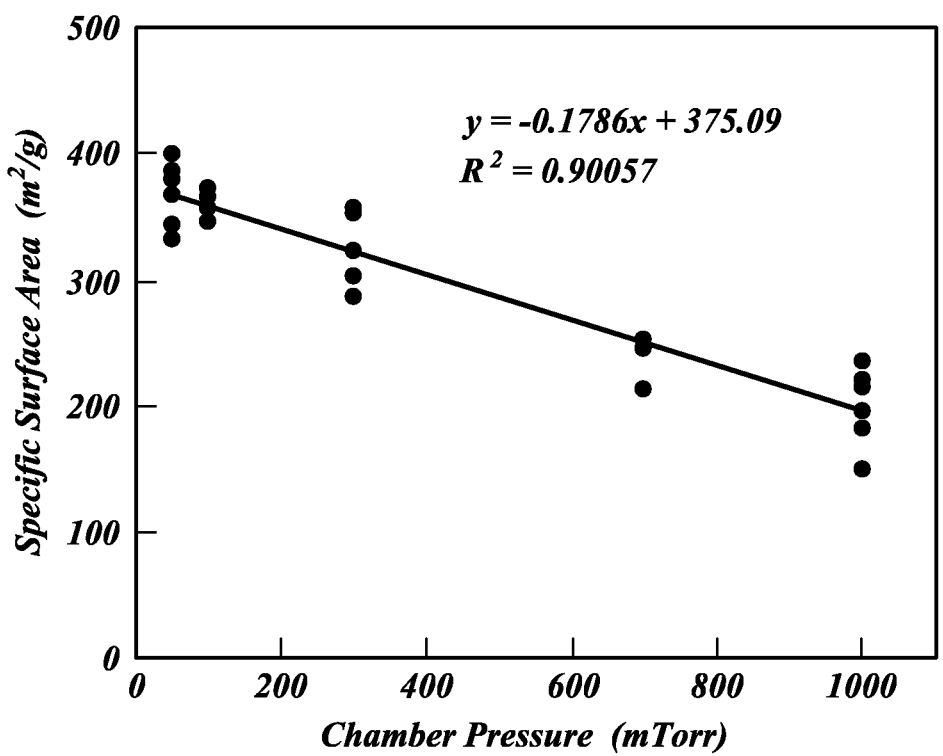
FIG. 11 is a graph of specific surface area vs. lyophilization chamber pressure for various lyophilized polymer gels (data from Table 6).

Comparison of the data for specific surface area and the chamber pressure revealed a dramatic relationship (FIG. 11). There is correlation that specific surface area of the lyophilized polymer gel decreases with increasing chamber pressure during lyophilization ($R^2=0.90$). This finding demonstrates that, for a fixed polymer gel composition and fixed freezing method, control of the specific surface area in the dried polymer gel can be modulated by control of the lyophilization chamber pressure. This relationship can be rationalized, at least in part, by the concurrent observation that the product temperature during the initial phase of drying (i.e., primary drying) is also dependent on the chamber pressure; specifically, the lower the chamber pressure, generally the lower the product temperature during primary drying. A lower temperature during primary drying should also minimize the opportunity for collapse of product porosity in the frozen state, and hence provide higher surface area.

TABLE 6

Summary of Characterization of Freeze Dried Samples

| Sample | Shelf Temp (° C.) | Chamber Pressure (mTorr) | Product Loading (g/in$^2$) | Sieving Size (um) | Yield (%) | Tap Density (cc/g) | Wt. loss on drying for BET (%) | BET Specific Surface Area (m$^2$/g) |
|---|---|---|---|---|---|---|---|---|
| 015-1 | 10 | 50 | 2 | 4750 | 81 | 0.162 | 6.7 | 390; 82 |
| 015-2 | | | 4 | | 81 | 0.156 | 5.1 | 399 |
| 015-3 | | | 4 | 2000 | 81 | 0.166 | 5.8 | 379 |
| 016-1 | 10 | 50 | 2 | 4750 | 80 | 0.170 | 5.6 | 367 |
| 016-2 | | | 4 | | 80 | 0.161 | 3.9 | 342 |
| 016-3 | | | 4 | 2000 | 80 | 0.197 | 12.3 | 332 |
| 008-1 | 10 | 100 | 2 | 4750 | 81 | 0.151 | 5.2 | 365 |
| 008-2 | | | 4 | | 81 | 0.158 | 3.7 | 349 |
| 008-3 | | | 4 | 2000 | ND | 0.171 | 4.6 | 347 |
| 006-1 | 10 | 300 | 2 | 4750 | 81 | 0.168 | 8.6 | 323 |
| 006-2 | | | 4 | | 81 | 0.180 | 4.3 | 303 |
| 006-3 | | | 4 | 2000 | 81 | 0.222 | 2.5 | 287 |
| 005-1 | 10 | 700 | 2 | 4750 | 78 | 0.220 | 5.7 | 250 |
| 005-2 | | | 4 | | 80 | 0.222 | 3.8 | 246 |
| 005-3 | | | 4 | 2000 | 81 | 0.244 | ND | 213 |
| 007-1 | 10 | 1000 | 2 | 4750 | 80 | 0.218 | 9.9 | 236 |
| 007-2 | | | 4 | | 80 | 0.200 | 7.7 | 221 |
| 007-3 | | | 4 | 2000 | 81 | 0.274 | 6.1 | 183 |
| 009-1 | 25 | 100 | 2 | 4750 | 80 | 0.155 | 6.4 | 372 |
| 009-2 | | | 4 | | 80 | 0.152 | 6.3 | 358 |
| 009-3 | | | 4 | 2000 | 81 | 0.211 | 3.9 | 347 |
| 014-1 | 25 | 300 | 2 | 4750 | 81 | 0.160 | 8.0 | 357 |
| 014-2 | | | 4 | | 81 | 0.170 | 5.0 | 353 |
| 014-3 | | | 4 | 2000 | 81 | 0.200 | 5.9 | 324 |
| 013-1 | 25 | 700 | 2 | 4750 | 80 | 0.190 | 5.0 | 245 |
| 013-2 | | | 4 | | 81 | 0.210 | 5.7 | 254 |
| 013-3 | | | 4 | 2000 | 81 | 0.240 | 5.7 | 250 |
| 012-1 | 25 | 1000 | 2 | 4750 | 81 | 0.155 | 5.1 | 215 |
| 012-2 | | | 4 | | 81 | 0.152 | 2.3 | 199 |
| 012-3 | | | 4s | 2000 | 81 | 0.211 | 5.2 | 150 |

Example 4

Snap Freezing Followed by Lyophilization Results in Low Surface Area for RF Hydrogel The RF hydrogel employed as the starting material in Example 3 was used herein to compare freezing of polymer hydrogel particles via snap freezing to freezing by immersion in liquid nitrogen. Snap freezing was specifically accomplished by placing RF hydrogel particles sieved between 4750 and 200 microns (that were precooled to 5° C.) in a lyophilizer, and then immediately pulling a vacuum. The control sample was the same RF hydrogel particles that had been frozen by immersion in liquid nitrogen, and dried under vacuum in the same experimental run at the same lyophilization conditions of product loading, shelf temperature, and chamber pressure setpoints. A summary of the sample, the control, and the data for tap density and specific surface area for the dried polymer hydrogel are given in Table 7.

TABLE 7

Summary of Samples and Data for Example 4.

| Freezing | Shelf Temp. (° C.) | Chamber Pressure (mTorr) | Product Loading (g/in$^2$) | Sieving Size (um) | Tap Density (g/cm$^3$) | Specific Surface Area (m$^2$/g) |
|---|---|---|---|---|---|---|
| Liquid nitrogen freezing (control) | 10 | 50 | 4 | 4750 | 0.16 | 349 |
| Snap frozen | | | | | 0.42 | 0.3 |

The data reveal that snap freezing results in very low specific surface area of the dried polymer cryogel, only about 0.3 m$^2$/g. In contrast, the control sample freeze dried in the same experiment exhibited a specific surface area of 349 m$^2$/g. It was also noted that the snap frozen sample was very dense, exhibiting signs that "collapse" had occurred upon lyophilization. To provide a quantitative comparison, the tap density of the snap frozen sample was measured and was indeed much greater than the control sample; 0.42 vs. 0.16 g/cm$^3$, respectively.

This example illustrates that the relatively rapid freezing at relatively high temperature provided by snap freezing was not capable of yielding the high specific surface area that can be achieved by rapid, multidirectional freezing at very low temperature, for example, that accomplished by immersion of RF hydrogel particles in liquid nitrogen.

Example 5

Differential Scanning Calorimetry of RF Hydrogel

Figure 12:
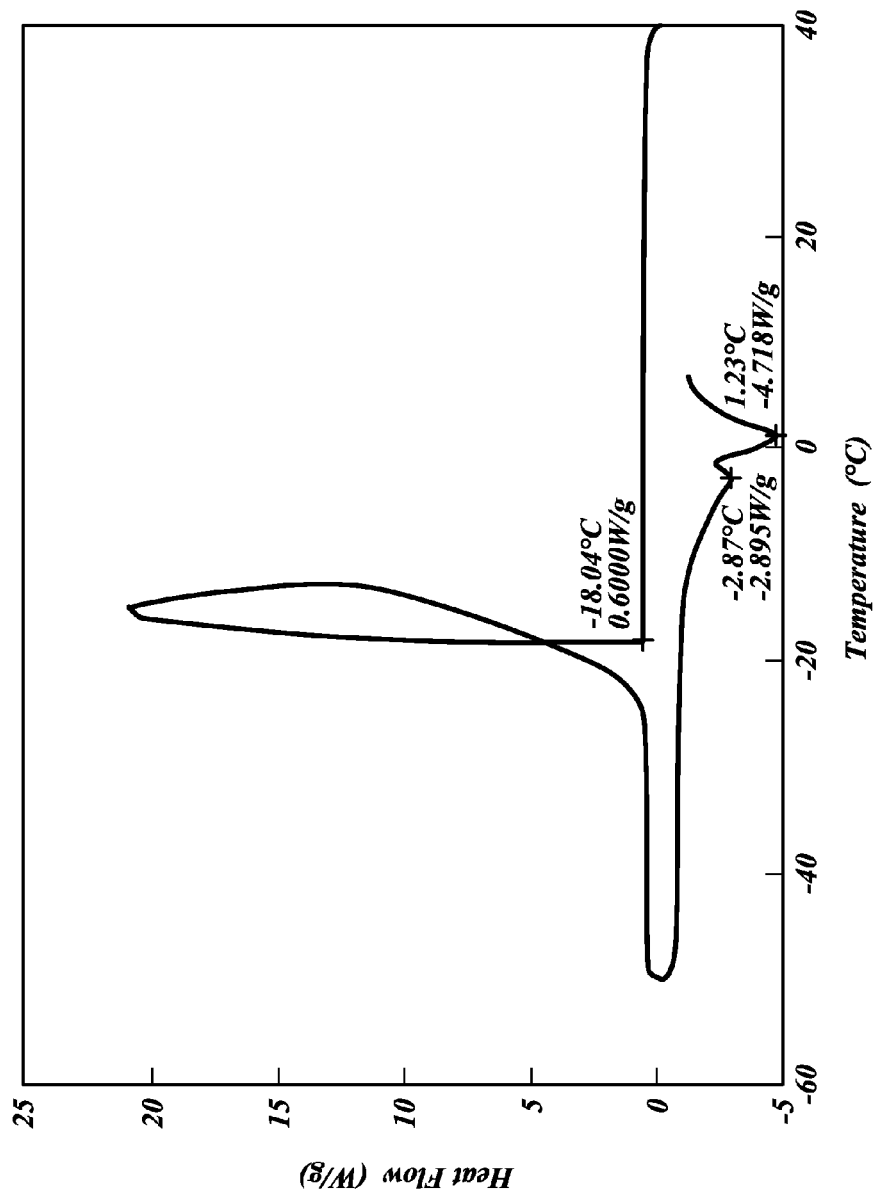
FIG. 12 is a differential scanning calorimetry scan for a polymer hydrogel.

The RF hydrogel of Example 3 was examined by differential scanning calorimetry (DSC) to discern the nature of any thermal events occurring during freezing. A representative thermogram is depicted in FIG. 12. The data show a large exothermic peak exhibited upon cooling at approximately −18° C. This event suggests that in order to achieve complete freezing of the material that the temperature must be brought to at least this temperature or below. Upon warming, there was a complex behavior seen, with several melting endotherms over the range of about −2 to +1 C, suggesting melting of different types of microstructures, and further supporting the conclusion that freezing drying conditions should be carefully selected to maintain fine product structure during the initial drying stage as discussed in more detail above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for preparing a polymer cryogel, the method comprising:
    A) admixing polymer precursors and a catalyst in a solvent to obtain a mixture;
    B) allowing the mixture to polymerize to form a gel; and
    C) freeze drying the gel to obtain a polymer cryogel,
    wherein the solvent is not exchanged for an organic extraction solvent prior to freeze drying.

2. The method of claim 1, wherein the polymer cryogel comprises less than about 1000 ppm of the organic extraction solvent.

3. The method of claim 1, wherein the polymer cryogel comprises a tap density of between about 0.10 g/cc and about 0.60 g/cc.

4. The method of claim 1, wherein freeze drying comprises rapidly freezing the gel in a liquid having a temperature below about −10° C.

5. The method of claim 4, wherein the liquid is liquid nitrogen or ethanol.

6. The method of claim 2, wherein the organic extraction solvent is t-butanol or acetone.

7. The method of claim 1, further comprising irradiating the mixture with microwave irradiation.

8. The method of claim 1, wherein the mixture is a suspension.

9. The method of claim 1, wherein the solvent is an aqueous solvent.

10. The method of claim 1, wherein the solvent is an organic solvent.

11. The method of claim 1, wherein the mixture comprises an aqueous phase and an organic phase.

12. The method of claim 1, wherein the mixture is an emulsion.

13. The method of claim 12, wherein the emulsion is selected from a water-in-oil (w/o) emulsion, oil-in-water (o/w) emulsion, oil-in-water-oil (o/w/o) emulsion, water-in-oil-in-water (w/o/w) emulsion, and water-in-oil-in-oil (w/o/o) emulsion.

14. The method of claim 1, wherein the method is for preparing a pyrolyzed polymer cryogel, and the method further comprises pyrolyzing the polymer cryogel.

15. The method of claim 1, wherein the method is for preparing an activated polymer cryogel, and the method further comprises pyrolyzing and activating the polymer cryogel.

16. The method of claim 1, wherein the mixture comprises a surfactant.

17. A method for preparing a polymer cryogel, the method comprising:
A) admixing polymer precursors in a multiphasic system to form polymer gel particles within the multiphasic system; and
B) freeze drying the polymer gel particles to obtain a polymer cryogel.

18. The method of claim 17, wherein the multiphasic system comprises an organic phase and an aqueous phase.

19. The method of claim 17, wherein the multiphasic system comprises a suspension.

20. The method of claim 17, wherein the multiphasic system comprises an emulsion.

21. The method of claim 20, wherein the emulsion is selected from a water-in-oil (w/o) emulsion, oil-in-water (o/w) emulsion, oil-in-water-oil (o/w/o) emulsion, water-in-oil-in-water (w/o/w) emulsion, and water-in-oil-in-oil (w/o/o) emulsion.

22. The method of claim 17, wherein the method is for preparing a pyrolyzed polymer cryogel, and the method further comprises pyrolyzing the polymer cryogel.

23. The method of claim 17, wherein the method is for preparing an activated polymer cryogel, and the method further comprises pyrolyzing and activating the polymer cryogel.

24. The method of claim 17, wherein the multiphasic system comprises a surfactant.

25. The method of claim 17, wherein the polymer gel particles comprise an average particle size of less than about 30 mm.

26. The method of claim 17, wherein the average particle size ranges from about 0.5 mm to about 10 mm.

* * * * *